US011295263B1

(12) United States Patent
Xie et al.

(10) Patent No.: US 11,295,263 B1
(45) Date of Patent: *Apr. 5, 2022

(54) SYSTEM AND METHOD FOR CARBON EMISSIONS EXPOSURE DETERMINATION

(71) Applicant: Morgan Stanley Services Group Inc., New York, NY (US)

(72) Inventors: Fengyi Xie, Long Island City, NY (US); Margaret Trench, Charlton, NY (US); Mahmoud Raya, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,126

(22) Filed: Jun. 1, 2021

Related U.S. Application Data

(63) Continuation of application No. 17/061,145, filed on Oct. 1, 2020, now Pat. No. 11,068,825.

(51) Int. Cl.
  *G06Q 10/06* (2012.01)
  *G06Q 40/02* (2012.01)
  *G06Q 40/06* (2012.01)

(52) U.S. Cl.
  CPC ..... *G06Q 10/06375* (2013.01); *G06Q 40/025* (2013.01); *G06Q 40/06* (2013.01)

(58) Field of Classification Search
  CPC ......... G06Q 10/06; G06Q 40/02; G06Q 40/06
  USPC ....................................................... 705/7.37
  See application file for complete search history.

(56) References Cited

U.S. PATENT DOCUMENTS

| 10,789,600 | B1 |  | 9/2020 | Lee et al. |
| 11,068,825 | B1 | * | 7/2021 | Xie ..................... G06Q 40/025 |
| 2005/0283428 | A1 | * | 12/2005 | Bartels .................. G06Q 40/04 |
|  |  |  |  | 705/37 |
| 2006/0089851 | A1 |  | 4/2006 | Silby |
| 2006/0095356 | A1 |  | 5/2006 | Koornstra |
| 2007/0233616 | A1 |  | 10/2007 | Richards |
| 2010/0042453 | A1 |  | 2/2010 | Scaramellino |
| 2011/0060614 | A1 |  | 3/2011 | Clark et al. |
| 2011/0071867 | A1 |  | 3/2011 | Chen |
| 2011/0119112 | A1 |  | 5/2011 | Waibel |

(Continued)

OTHER PUBLICATIONS

Steven, Ben, "This app will automatically tell you the carbon footprint of your shopping", Nov. 21, 2019, 5 pgs, https://www.chargedretail.co.uk/2019/11/21/this-app-will-automatically-tell-you-the-carbon-footprint-of-your-shoooinq/.

(Continued)

*Primary Examiner* — Nga B Nguyen
(74) *Attorney, Agent, or Firm* — Pearl Cohen Zedek Latzer Baratz LLP

(57) ABSTRACT

A system and method may determine the carbon emissions risk to an institution through its lending and investment activities to a plurality of counterparties by, for example, determining carbon emissions data for a number of counterparties and, for each counterparty, determining the carbon emissions risk to the institution. A system and method may determine the proportion of total capital of a counterparty that is being financed by a bank, and multiply this by a carbon emissions measure for the counterparty. Embodiments may be applied to determine optimal investment strategies for managing an institution's exposures to carbon risk over time.

20 Claims, 11 Drawing Sheets

(56) References Cited

U.S. PATENT DOCUMENTS

| | | | |
|---|---|---|---|
| 2011/0208621 | A1 | 8/2011 | Feierstein et al. |
| 2011/0213690 | A1 | 9/2011 | Ghosh |
| 2012/0323619 | A1* | 12/2012 | Risz ............... G06Q 30/0206 705/7.11 |
| 2013/0338936 | A1 | 12/2013 | Hana et al. |
| 2014/0012553 | A1 | 1/2014 | Kelly |
| 2016/0117774 | A1 | 4/2016 | Bateman |
| 2017/0103325 | A1 | 4/2017 | Meinrenken et al. |
| 2018/0060204 | A1 | 3/2018 | Jin et al. |
| 2018/0182044 | A1 | 6/2018 | Iannace et al. |
| 2019/0026750 | A1 | 1/2019 | Abdelsamie |
| 2019/0066217 | A1* | 2/2019 | Stoner, Jr. ............... G06Q 40/06 |
| 2019/0213097 | A1 | 7/2019 | Jin et al. |
| 2019/0370708 | A1 | 12/2019 | Shih et al. |
| 2020/0020036 | A1 | 1/2020 | Stoner, Jr. et al. |
| 2020/0320494 | A1 | 10/2020 | Chepe et al. |

OTHER PUBLICATIONS

Pohjanpalo, Kati, Finland has an app to calculate carbon footprint based on user's purchases, Nov. 21, 2019, 4 pgs, https://www.business-standard.com/article/current- affairs/finland-has-an-app-to-calculate-carbon-footprint-based-on-user-s-purchases- 1191121005491.html.

"The Partnership for Carbon Accounting Financials (PCAF), has outlined principles and goals for measuring and controlling financed emissions." Sep. 24, 2020.

AR6 Synthesis Report: Climate Change 2022, https://www.ipcc.ch/report/sixth-assessment-reportcycle/_Printed on Oct. 1, 2020.

Recommendations of the Task Force on Climate-related Financial Disclosures, Jun. 2017.

Enhancing banks' and insurers' approaches to managing the financial risks from climate change, Bank of England, Apr. 15, 2019 https://www.bankofengland.co.uk/prudentialregulation/publication/2019/enhancing-banks-and-insurers-approaches-to-managing-the-financialrisks-from-climate-change-ss .

PACF, "PACF Carbon Accounting," 2020.

The Global Industry Classification Standard (GICS) is an industry taxonomy developed in 1999 by MSCI and S&P for use by the global financial community. The GICS structure consists of 4 levels, i.e. sector, industry group, industry, and sub-industries. For more details, see: https://www.spglobal.com/marketintelligence/en/documents/112727-gicsmapbook_2018_v3_letter_digitalspreads.pdf.

Wikipedia, "Wikipedia," [Online]. Available: https://en.wikipedia.org/wiki/List_of_countries_by_carbon_dioxide_emissions . [Accessed 2020]. Original source: Fossil CO2 emissions of all world countries.

Asik, et al., Policy Enforcement upon Software Based on Microservice Architecture, IEEE, SERA, Jun. 2017.

West, et al., Evaluating the Use of a Carbon Footprint Calculator: Communicating Impacts of Consumption at Household Level and Exploring Mitigation Options, Journal of Industrial Ecology, vol. 20, No. 3, 2015, pp. 396-409.

Peters, "this credit card won't let you buy anything else after you've hit your annual carbon limit, fastcompany.com" May 2019.

Edmond "this credit card has a carbon-emission spending limit, World Economic Forum" May 2019.

Greenhouse Gas Protocol, World Resources Institute, accessed on Oct. 3, 2011. https://ghgprotocol.org/sites/default/files/standards_supporting/FAQ.pdf.

Office Action for U.S. Appl. No. 17/335,119 dated Sep. 2, 2021.

TCFD. "Implementing the Recommendations of the Task Force on Climate-related Financial Disclosures" pp. 1-85. U.S. Global Change Research Program. Online. Jun. 2017; [retrieved Nov. 16, 2021], Retrieved from the Internet: <URL:https://data.g obalchange.gov/file/54e24859-7ed8-4064-95b5-2842658afe65>.

PCAF. "The Global Accounting Standard For the Financial Industry: Draft version for public consultation" pp. 1-107. Partnership for Carbon Accounting Financials. Online. Aug. 2020; [retrieved Nov. 17, 2021). Retrieved from the Internet: <URL: https://www.ssga.com/library-cor.tent/pdfs/insights/carbon-footprinting-an-anvestor-toolkit.pdf>.

Nguyen et al. "Eu Climate Benchmarks Reality and consistency check" pp. 1-81. Natixis. Online. Nov. 2019; [retrieved Nov. 17, 2021], Retrieved from the Internet: <URL: https://gsh.cib.natixis.com/api_website_feature/files/download/8915/natixis_gre en_and_sustainable_hub_special_report_-_eu_climate_benchmarks.pdf>.

Tan et al. "Managing Climate and Carbon Risk in Investment Portfolios" pp. 1-54. Society of Actuaries. Feb. 2018; [retrieved Nov. 17, 2021], Retrieved from the Internet: <URL:https://www.soa.org/globalassets/assets/Files/resources/research-report/2018/managing-climate-carbon-risk.pdf>.

International Search Report and Written Opinion for PCT Appl. No. PCT/US21/52629 dated Jan. 5, 2022.

Notice of Allowance for U.S. Appl. No. 17/335,119 dated Jan. 26, 2022.

* cited by examiner

FIG. 9

SYSTEM AND METHOD FOR CARBON EMISSIONS EXPOSURE DETERMINATION

PRIOR APPLICATION DATA

The present application is a continuation of prior U.S. application Ser. No. 17/061,145, filed on Oct. 1, 2020, entitled "SYSTEM AND METHOD FOR CARBON EMISSIONS EXPOSURE DETERMINATION", incorporated herein by reference in its entirety.

FIELD OF THE INVENTION

The present invention relates generally to providing a determination of an exposure to the "carbon footprint" (e.g., amount of carbon dioxide or other greenhouse gas emissions) of counterparties.

BACKGROUND OF THE INVENTION

Computer systems and technologies exist to determine carbon emissions of individual companies and the "carbon impact" or "carbon footprint", e.g., the total greenhouse gas (GHG, e.g., carbon dioxide and methane) emissions caused by the companies, including for example emissions involving manufacture, transport, use, disposal, etc. of products and services. Carbon impact may be expressed for example as carbon dioxide equivalent, but may capture greenhouse effects from gasses other than carbon dioxide.

For example different companies may have carbon emissions or footprint data relevant to the organization's operations or sales. Such data may be collected, calculated and provided by a service, such as the Standard & Poor (S&P) Trucost data service described at www.trucost.com, providing data which may be licensed.

Climate change resulting from carbon emissions poses risks to financial institutions having as counterparties (e.g., lendees or obligors) companies which themselves may be subject to risk due to climate change. Financial firms may need to evaluate internally and disclose climate-related risks. Climate risks may be separated into two categories:

Transition risks: The risks to businesses or assets that arise from policy and legal actions, technology changes, market responses, and reputational considerations as the international community seeks to slow the pace of climate change by transitioning to a lower-carbon economy.

Physical risks: The risks to businesses or assets emanating from changes in climate that are already occurring and are projected to continue. These can be event-driven, such as increasingly intense and frequent storms, or related to chronic, longer-term shifts in precipitation and temperature.

Financial institutions now face the tasks of identifying, managing and disclosing their exposures to climate change. Given the nescient state of understanding climate data as it relates to financial portfolios, systematic approaches and tools to interpret and attribute climate data are needed to incorporate climate change metrics into business planning and portfolio management practices. Prior systems for analyzing carbon emissions data and financial exposure data do not form a coherent view on institutions' historical performance and future plans to manage climate change-related risks.

SUMMARY OF THE INVENTION

A system and method may determine the carbon emissions risk to an institution of a plurality of counterparties to the institution (e.g., where the institution provides loans or financing to the counterparties) by for example determining carbon emissions data for a number of counterparties, and for each counterparty, determining the carbon emissions risk to the institution by multiplying the carbon emissions data for the counterparty (e.g., tonnes of carbon dioxide emitted per year per unit of revenue) by the exposure of the institution to the counterparty.

A system and method may improve prior carbon footprint calculation technology and financial analysis technology, and may provide a technology solution which may for example combine carbon emissions data with data regarding counterparties to enable an institution to analyze and alter its carbon risk and the amount of carbon emissions it finances.

Targets or limits may be established for financial investment in institutions based on an optimization method so as to reduce the financed emission while meeting criteria for the portfolio risk and return profile on a forward looking basis. In addition to lending book exposures, embodiments may determine a firm's carbon emission risk by analyzing a financial institution's trading book exposures and counterparty current exposures of the trading book.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

FIG. 9 depicts a display, e.g., presented to a user, allowing a Distribution Analysis calculation and display, where a user analyzes the financed emission of a specific counterparty of an institution, according to an embodiment of the present invention.

Figure 1:
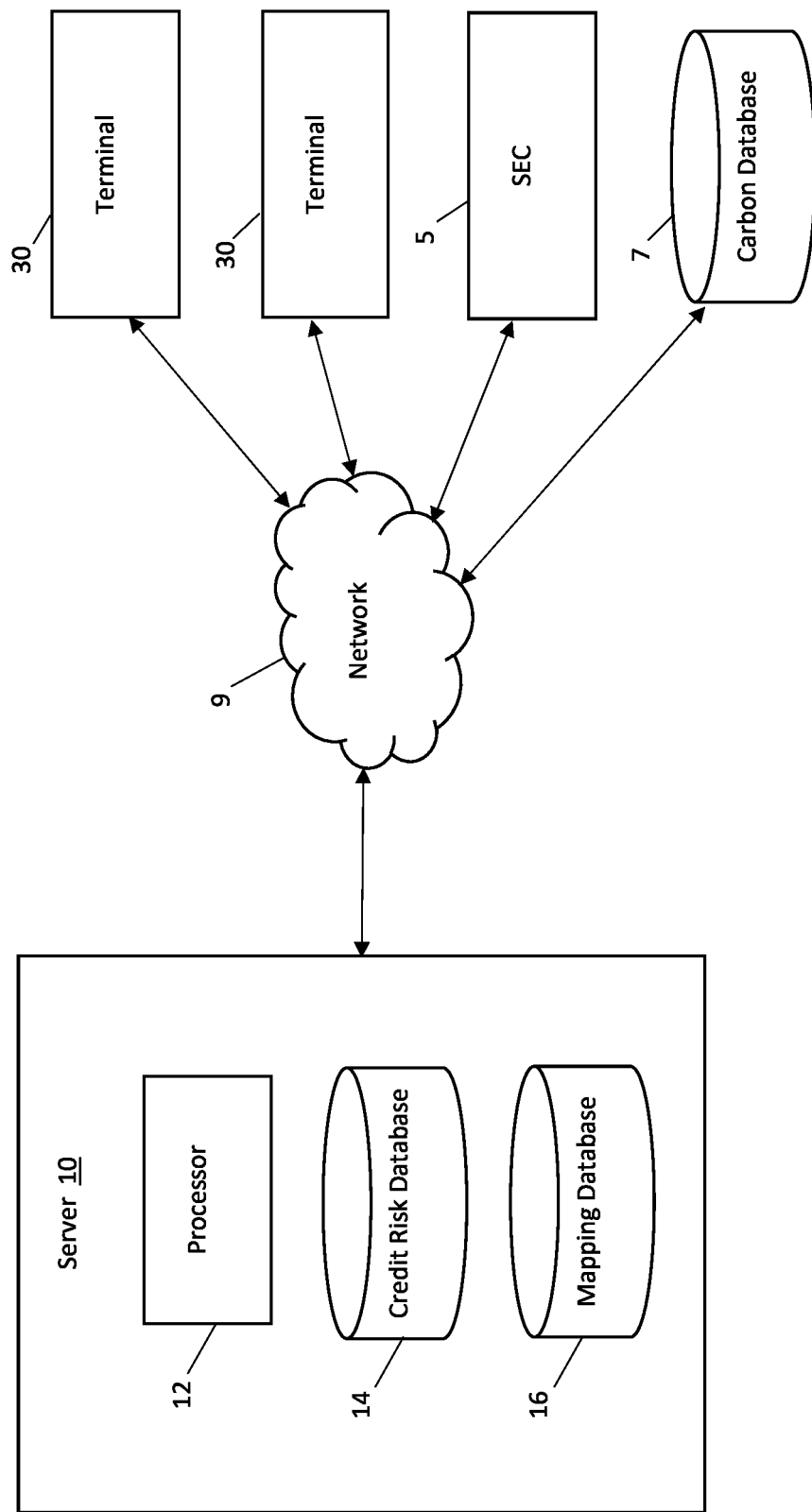
FIG. 1 depicts a carbon footprint exposure calculation system according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

FIG. 1 depicts a carbon footprint tracking and calculation system according to embodiments of the present invention. Some of the components of FIG. 1 may be separate computing devices such as servers and others may be combined into one computing device. Some modules in FIG. 1 may be included in other computing devices than as shown.

Figure 11:
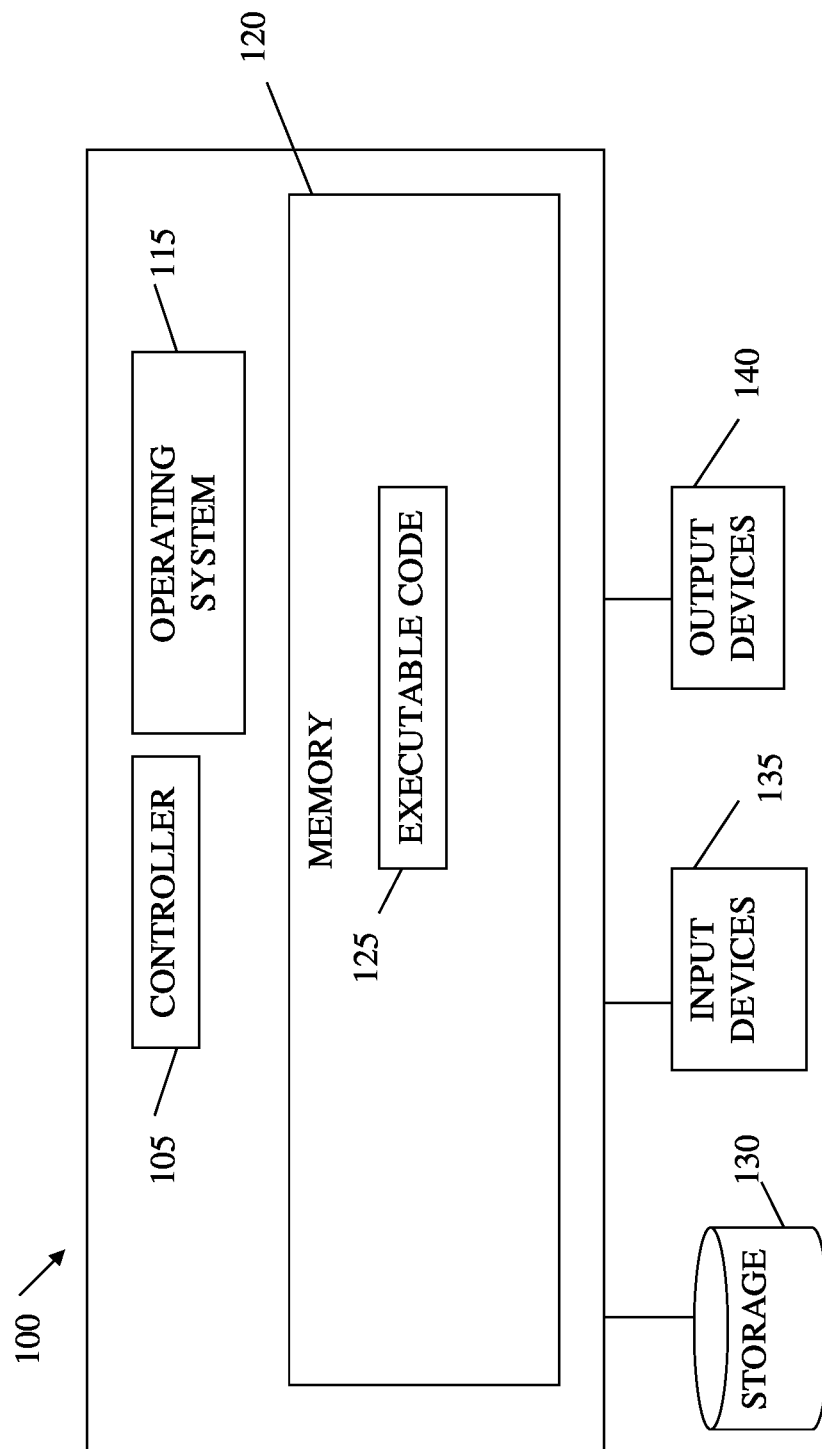
FIG. 11 shows a high-level block diagram of an exemplary computing device according to some embodiments of the present invention.

Server 10 may include one or more processors 12; and a credit risk management database 14 storing, e.g., financial information, counterparty information, debt and equity information, exposure information, and possibly other information; a mapping database 16 which may map, e.g., Trucost company identifiers to internal (to the owning institution) company identifiers; and possibly other mapping information. Server 10 may accept data from external sources such as an SEC (Securities and Exchange Commission) source 5 and a carbon information database 7 (e.g., the Trucost database), or other sources. User terminals 30 may be connected to server 10, for example by network 9, and may display reports to users, and allow users to input information or queries, or request information or otherwise control a process of determining carbon risk exposure, for example via a GUI. Components of FIG. 1 such as databases, server 10, terminals, and a processor may be or include components such as depicted in FIG. 11. Server 10 may determine carbon risk exposure, and generate reports (e.g., provided as screen displays on terminals 30). In other embodiments, other configurations of components and databases may be used; for example in place of a server processing may be performed by a desktop or laptop computer.

Embodiments may provide quantitative measures that leverage both carbon emission data from external sources and the internal financial exposure data of a given institution such as a bank to capture the bank's exposure to climate risk through its financial transactions with counterparties. For example, by lending to a utilities company that is a heavy GHG emitter, a bank can be exposed to heightened credit risk should there be a carbon emission tax imposed on such companies. Embodiments may measure such risk over time and provide useful output. Two example quantitative indices of carbon emissions risk produced by embodiments may include:

Carbon Intensity Index, combining sector-level exposures of a bank or institution with the sector-average carbon intensities sourced from an external source or vendor, and showing how a bank's portfolio mix over time affects its climate risk profile. This may be used to compare different banks' trends in climate risk profiles. A carbon intensity index may measure relative or absolute counterparty exposures, and may be expressed as metrics such as a relative measure. A relative measure may use sector exposures in %. This variation may express the relative vulnerability of a bank, regardless of its size, where % may be defined as a sector's exposure divided by the total exposure across all sectors for a specific institution or in general, across all data outside of an institution: e.g., 20% of a bank's total exposure could be coming from the Energy sector. A carbon intensity index may be expressed as an absolute measure, utilizing sector exposures in currency such as dollars, which may take into account the absolute size of a bank.

The Financed Emission Index combining a bank's or institution's internal granular exposure data with company-level carbon emission information sourced externally, providing a detailed view on the amount in carbon emissions the bank is funding through its lending activities. This metric can be leveraged to provide guidance on how to manage towards carbon targets or neutrality for the bank, as well as to inform future compliance and reporting requirements. This may measure the amount of carbon emission sponsored indirectly through a firm's financing and/or trading activities.

Both the Carbon Intensity Index and the Financed Emission Index measure how carbon intensive a bank's investments are, but from different perspectives. A Carbon Intensity Index may capture a bank's investments from a financial risk perspective, particularly in terms of financial exposure to carbon intensive industries. For example, banks that have exposures that are skewed towards industries such as Utilities, Energy, or Materials may be exposed to heightened financial risk if a carbon tax is imposed, since companies in those industries are usually heavy carbon emitters. Also, to capture the financial risk aspect, carbon intensities (e.g., emission/revenue) may be used in the calculation, not carbon emissions. A Financed Emission Index may measure the amount of carbon emission a bank is responsible for by investing in individual companies or by engaging in trading activities with counterparties, by accounting for the size of the company the bank is lending to or the size of the trading exposure (e.g., by taking the ratio of investment/(equity+ debt)), but may not take into account the revenue of the company (e.g., by using carbon emission instead of carbon intensity). With proper carbon emission data, the Financed Emission Index can be leveraged to provide guidelines on how a bank can work towards carbon neutrality.

While lending is described herein as one exposure, other risks or exposures may be measured, such as investments, equity holdings, and trading book exposures.

Various data sources may be used, such as:

The internal financial information of the institution operating an embodiment of the present invention (which may be termed the "owning institution"), e.g., the institution's credit portfolio. This information may be from the owning institution's credit portfolio data and internal databases;

The institution's trading book portfolio. This information may be from the owning institution's trading book data and internal databases;

Sector-level credit lending exposures of the owning institution and other "peer" or competitor institutions or banks;

Financial statement data of the owning institution's counterparties;

Carbon emission data for counterparties, such as from Trucost (a subsidiary of Global S&P);

Information on counterparties, including among other variables, data containing point-in-time information of the counterparty's sector, rating and exposure size;

Sector-level credit lending exposures of banks which may be collected from their 10-Q/K SEC filings. Such information may be in the commercial credit exposure section. Banks report their committed lending exposure to each sector regularly; and Financial statement data of the owning institution's counterparties which may be stored internally to the institution, including data such as total capital of the company as defined by for example equity plus debt or adjusted total debt.

The Trucost or another service or database may provide data on the amount of carbon emissions a company produces over a certain period. Such a service may also provide other climate metrics for analytics, including energy usage, physical risk sensitivity, etc. Typically, the carbon emissions values received from such a service for or assigned to a company are on a yearly basis (e.g., an annual carbon emission value) but other periods or measures measuring the carbon emissions of a merchant may be used. A set of example values received from such a database for each company may include Global Industry Classification Standard (GICS) category and subcategory, annual tonnes (metric tonnes) of carbon or carbon equivalent emitted, such as the sum of scopes 1, 2 and 3, annual revenue in millions of dollars, and carbon or carbon equivalent emitted per dollar of revenue (e.g., per year), all typically on an annual basis (other time periods may be used). The internal lending exposure of each counterparty may be calculated by aggregating across the products—e.g., different loans or other financial products—under this counterparty's name, at the company level. While dollars are used as an example currency herein, other currencies may be used.

External data (e.g., from Trucost) may need to be mapped to internal data; for example counterparty ID and sector IDs, or sovereign IDs or definitions may be different across databases internal to an investor and external. Similar mappings may be performed for a Firm's trading book exposures to external data sources. Mappings may be done in advance of carbon calculations, creating an internal table mapping external IDs to internal IDs. Sectors may be defined by the Global Industry Classification Standard (GICS); banks may report sectors in different fashions, but may be mapped by a calculating institution to the standard GICS.

Total annual carbon emissions for a company may be categorized as Scope 1, Scope 2 and Scope 3 categories of information within the Greenhouse Gas Protocol. Scope 1, or Direct GHG emissions, may include all direct GHG emissions by a company, or under direct control of a company, such as fuel combustion directly caused by the company (e.g., at a factory manufacturing a t-shirt), company vehicles and fugitive emissions. Scope 2, electricity indirect GHG emissions, may cover indirect GHG emissions from consumption of purchased electricity, heat or steam. Scope 3, all other indirect emissions from activities of the organization, may occur from sources that the organization does not own or control, such as business travel, procurement, waste and water, or from purchased commodities (e.g., source materials such as beef or cotton). For each company or counterparty scope 1, 2 and 3 values (in units of for example weight or mass of $CO_2$ or equivalent per time period, e.g., metric tonnes $CO_2$ per year) may be received from a public or subscription service (e.g., the S&P service). Example data from Trucost's carbon emission dataset may include company information (name, ID (identification), sector, country), financial information (revenue, currency) and emission information (carbon emitted at different scopes, carbon intensity).

In one embodiment, the carbon intensity of a company or counterparty may measure the amount of greenhouse gas it emits to generate one unit of revenue, typically over a period of time. A company's carbon intensity may be its carbon emissions (e.g., scopes 1, 2 and 3 added together, but other measures may be used) divided by its total revenue, per year, other time frames may be used in which both carbon emission and carbon intensity and revenues for a given company are taken from the same time frame. For a financial institution that lends to other companies, e.g., counterparties, its exposures to all its counterparties can be summarized in terms of those counterparties' carbon intensities. Similarly, for a financial institution that has exposures to other companies through its trading activities, its exposures to all its counterparties can also be summarized using the same logic.

An embodiment may calculate a carbon intensity index for an institution as the ratio of the amount of loans by the institution to a counterparty to the total amount of loans made by the institution; this may be multiplied by the carbon intensity of the counterparty. In some embodiments this may be summed or aggregated across all or many counterparties for an institution to create another measure of a carbon intensity index. In one embodiment, for each counterparty, a process may determine the carbon emissions risk to the institution by multiplying the carbon emissions data for the counterparty by the exposure of the institution to the counterparty (e.g., amount lent to the counterparty) and dividing the exposure by the total amount of exposure made by the institution. Exposure may include loans, swaps, or other trading book exposures. The carbon intensity index of a lender or owning institution may be calculated as a weighted average of its counterparties' carbon intensities, with the weights being the proportions of the lender's exposure to its counterparties, as in example Formula 1:

$$\text{Carbon Intensity Index} = \Sigma_i \text{Exposure}_i / \text{Total Exposure} \times \text{Carbon Intensity}_i \quad \text{Formula 1}$$

In Formula 1 Exposure$_i$ may be a bank's financial exposure to counterparty i, which may be cumulative exposure (e.g., across multiple loans or other exposures to the counterparty). A firm's financial exposure to trading for a counterparty i may be defined as delta exposure as known in the art or current credit default exposure that the firm has to counterparties on derivatives contracts; lending exposure may be the total loan commitment amount made by the Firm to a counterparty. Exposure, when used in a formula as a dollar amount, may indicate the amount, in currency, that the institution has lent to or otherwise invested in (e.g., via a swap) in the counterparty. Total Exposure may be the sum of all counterparties' exposures for the bank. Apart from the lending exposure, total trading exposure may be the sum of delta exposures which may be for example the value change or profit and loss ("P&L") per unit move in the underlying price/volatility. Carbon Intensity$_i$ may be the carbon intensity of counterparty i, for example obtained from vendor carbon emission data, e.g., Trucost; for example in units of tons or tonnes of carbon emissions/revenue in currency/year. As with other measures discussed herein, time periods other than years may be used. Carbon Intensity Index may be measured in units of tons or tonnes of carbon/unit of revenue (e.g., millions of dollars)/time period (e.g., year). While in Formula 1, and in the other Formulas discussed herein, the investment or exposure correlated to a carbon intensity is financial exposure to a counterparty, other investments or exposures may be used, as discussed elsewhere. The relevant investment or exposure (e.g., Exposure$_i$) is tied in the relevant formula to a relevant carbon intensity (e.g., Carbon Intensit) that represents some measure of the carbon emissions of the investment of exposure. For example, if the investment or exposure is a swap or derivatives contract, the Carbon Intensity$_i$ may be the carbon intensity of the counterparty or the substance of the swap (e.g., e.g., a commodity); if the investment or exposure is a delta-based exposure, the Carbon Intensity$_i$ may be the carbon intensity of the sector or subsector for the company (e.g., an average of companies in the sector or subsector); and if the investment or exposure is a trading book exposure, the Carbon Intensity$_i$ may be the carbon intensity of the sector or subsector for the company.

Formula 1 above, and the other formulas discussed herein, may be calculated for Scope 1, Scope 2, and Scope 3, and in addition the combination of Scopes 1, 2 and 3; if other carbon emissions data is divided into categories different calculations may be performed for these categories. While i in the various formulas discussed herein typically represents each counterparty in the portfolio of an institution (or each counterparty for which the institution has accurate data), i in other embodiments may represent other entities such as an entire industry, sector, etc. such that each i causes the formula to add a measure of the entity's carbon emissions. The designation for i may also be represented as an individual loan, position or a trade, such as the delta exposure for a trading position. For example, carbon emissions may be aggregated across companies in a sector to produce sector i's carbon emissions. For some lending counterparties, where financial information is not available, carbon intensity, financed emissions, or other formulas may not be able to be calculated.

A variation of a carbon intensity index may use absolute dollar value exposure for each counterparty as the weight, instead of using relative exposure in percentage. An example version of this carbon intensity index is expressed in Formula 2, having the same variable definitions as Formula 1:

$$\text{Carbon Intensity Index} = \Sigma_i \text{Exposure}_i \times \text{Carbon Intensity}_i \quad \text{Formula 2}$$

This variation of carbon intensity index takes into account the size of the institution or bank. As with other Formulas discussed herein, Formula 2 can be based on a different investment or exposure. As a result, larger banks tend to have higher carbon intensity indices, are more carbon intensive and are more sensitive to carbon regulations. Small banks may have lower absolute exposure to carbon and carbon regulations.

Formula 2 may, as opposed to normalizing by percentage, account for total dollar amount. The units for Formula 2 are not absolute tons of carbon, but rather exposure (in currency)*carbon emissions/revenue (in currency)*time period (e.g., e.g., year). (In this example formula it may be confusing to cancel the two currency values, as they measure different things.)

In order to determine variables such as Exposure$_i$ and Total Exposure for specific counterparties, an owning institution may access its own internal databases, for example which may contain exposure and lending specific data at the transaction level. An owning institution may make use of its internal lending exposure data which are more granular than the SEC 10-Q/K reported exposures by sector. However, for purposes of an embodiment performing competitive analysis of an owning institution against other institutions, and to ensure direct and consistent comparisons between banks' indices can be made, preferably sector or SEC 10-Q/K exposure data, available from public sources or databases. For example, individual institutions' investor relations websites may be used to compare the owning institution to other banks. An example of such a database is the United States Securities and Exchange Commission Filing Form 10K Annual Filing for fiscal year 2015 commission, file number 1-9924 for Citigroup obtained from the Citigroup investor relations web page.

In one embodiment, counterparties may be divided into sectors, for example Communications Services, Consumer Discretionary, Consumer Stables, Energy, etc. Another embodiment may divide trading exposures into asset classes including but not limited to Commodity, Equity, FX (currency trading, an example being on the Forex exchange), Interest Rates, or Credit Trading Books. An embodiment may measure carbon exposure of the aggregation of counterparty current exposures in the trading book to industry sectors (e.g., communications services, consumer discretionary, energy, etc.). An embodiment may measure carbon exposure of an aggregation of exposures in any or all of these groups (trading book delta exposures, counterparty current exposures, and counterparty lending exposures) to the sovereign level, or alternatively to the firm level. Sectors may be based on general sectors and/or based on standards such as the Global Industry Classification Standard (GICS) which is an industry taxonomy developed in 1999 by MSCI Inc. and S&P. The GICS structure includes of 4 levels: sector, industry group, industry, and sub-industries.

The various measures (e.g., Carbon Intensity Index, Financed Emission Index, etc.) may be measured per counterparty, per sector, or in other ways. In some embodiments a carbon emissions amount such as carbon equivalent emitted per dollar of revenue per year may be calculated for each sector, and this may be used in other calculations described herein. To obtain a sector-level carbon emissions value or intensity, an external database (e.g., Trucost) may be consulted, or each sector's carbon emissions may be calculated by for example averaging companies' values or intensity within the sector, or performing a weighted sum for all companies or counterparties in the sector (e.g., as defined by GICS structure)

Carbon emission data for companies may be averaged within a sector to arrive at a sector-average carbon emission measure. In addition, using for example internal data, bank exposure and financial data may be aggregated to sector level. Both emissions and exposure outputs may be mapped on a sector level to create sector-level carbon exposure measures. For example, for a given bank or owning institution, and for each sector, an index component, e.g., measure, may be calculated (e.g., Carbon Intensity Index or Financed Emission Index). For an owning institution, each counterparty in a sector may be mapped to its carbon data, a calculation performed, and the data aggregated to sector level measures. The aggregation may weight each sector by the institution's exposure to each sector. For a competitor institution, where possibly only sector level information is available to an owning institution, the sectors' calculated carbon data may be used along with the sector exposures to calculate a measure. Index components may be aggregated or added across sectors to arrive at a final measure (e.g., Carbon Intensity Index) for each institution. For the owning institution, since more granular exposure data may be available internally to that institution (e.g., specific exposures to specific counterparties), the index can be constructed with company-level information, instead of sector-level information (for competitor institutions company-based exposure may not be available). Such measures may be calculated for each of Scope 1, Scope 2 and Scope 3.

The various carbon measures discussed herein such as a carbon intensity index or financed emissions may be calculated based on investments or exposures other than lending exposure to a counterparty. For example, measures of carbon exposure may be based on trading book exposures such as counterparty current exposures ("CE"), commodity ("CM") investments, equity ("EQ") or stock investments, interest rate investments, or credit (CR) trading books; or deltas (or other "greeks", such as gamma) or derivatives of the commodities, equities, foreign exchange ("FX") or currency investments, interest rates ("IR"), or credit trading books; or counterparty current exposures of a firm's trading book. Such data or exposures may be stored in the firm's internal databases. For each such exposure, the source carbon intensity data (e.g., sector average carbon intensities) is the same, but the carbon data may be adjusted or manipulated to suit the relevant investments or exposures. Such calculations may be done at different granularities, such as GICS sector, GICS sub-industry, company or even position levels.

An example of a non-lending investments or exposures based on GICS sector level granularity includes an assumption that an example commodities trading book includes three companies, with two utilities sector companies and one financials sector company. The owning institution may have multiple positions and/or trades with a single company. The delta exposure of one position may be defined as the profit and loss ("P&L") of that position given a 100% increase of the price or volatility of the position's underlier. (The 100% increase may be in the underlier's price or the underlier's volatility, depending on the product type (since certain derivatives are priced on volatility). Delta exposures of the equities and FX trading portfolios may be defined similarly as above.

Table 1 depicts example exposures to the three example companies, with CM representing commodities. While the asset class in example Table 1 is commodity, the company need not be a commodity-based company; rather the asset may be a swap with the company based on the CM asset class, or, in another example, a swap based on IR (interest rates):

TABLE 1

| Asset Class | Company Name | Position ID | GICS Sector | MS Delta Exposure |
|---|---|---|---|---|
| CM | Company ABC | 39263319 | Utilities | 100 |
| CM | Company ABC | 39263320 | Utilities | 80 |
| CM | Company DEF | 39663318 | Utilities | −60 |
| CM | Company XYZ | 39200211 | Financials | 200 |
| CM | Company XYZ | 39200212 | Financials | −50 |

Table 2 depicts example average carbon intensities for various sectors.

TABLE 2

| GICS Sector | Average Carbon Intensity |
|---|---|
| Communication Services | 80 |
| Consumer Discretionary | 380 |
| Consumer Staples | 990 |
| Energy | 1030 |
| Financials | 50 |
| Health Care | 160 |
| Industrials | 390 |
| Information Technology | 190 |
| Materials | 1560 |
| Real Estate | 180 |
| Utilities | 3260 |

Using the data in Table 1 and Table 2, a version of Formula 1 above can be calculated as an example application of Formula 1:

$$\frac{100+80-60}{270}*3260+\frac{200-50}{270}*50=1476.67$$

In this example application of Formula 1, the first term is the sum of three exposures in the Utilities category divided by the sum of all exposures (100+80−60+200−50=270), multiplied by the carbon intensity of the category Utilities, and the second term is similar, for the Financials category. In Formula 1, carbon emissions data corresponding to one or more exposures to the institution may be determined or gathered (e.g., in Table 1) the carbon emissions risk to the institution may be calculated or determined by multiplying the carbon emissions data for the exposures by the exposures themselves. In the specific example of Formula 1 above, this is done for each of a number of sectors or industries: exposures are grouped by sector or industry and summed within each grouping, and for each grouping of exposures corresponding to an industry or sector, the sum of the exposures in the grouping may be divided by the sum of all exposures across all groupings (e.g., the sum of the exposures in the formula) to produce a normalized grouping sum. The multiplying of the carbon emissions data for the exposures by the exposures may then be performed by multiplying the carbon emissions data for an industry or sector corresponding to a grouping by the normalized grouping sum associated with that industry or sector. Other formulas discussed herein can similarly be modified to include different exposures.

An example of interest rate investments or exposures includes an assumption that an interest rates trading book includes three companies, two utilities companies and one financials company. The owning institution may have multiple positions and/or trades with a single company. The delta exposure of one position may be defined as the P&L of that position given a 1 basis point (or 0.01%) increase of the price or volatility of the position's underlying rate. (The 100% increase could be in the underlier's price or the underlier's volatility, depending on the product type, since certain derivatives are priced on volatility). The delta exposures of the credit products (CR) trading portfolio may be defined similarly as above. A hypothetical commodities trading book portfolio is shown in Table 3, where asset class IR is interest rate:

TABLE 3

| Asset Class | Company Name | Position ID | GICS Sector | MS Delta Exposure |
|---|---|---|---|---|
| IR | Company ABC | 39263319 | Utilities | 5 |
| IR | Company ABC | 39263320 | Utilities | −1 |
| IR | Company DEF | 39663318 | Utilities | 2 |
| IR | Company XYZ | 39200211 | Financials | 3 |
| IR | Company XYZ | 39200212 | Financials | 1 |

The example carbon intensity data used is the same as those in Table 2 above. The version of Formula 1 above can be calculated as an example application of Formula 1:

$$\frac{5-1+2}{10} * 3260 + \frac{3+1}{10} * 50 = 1976$$

In this example application of Formula 1, the first term is the sum of three exposures in the Utilities category divided by the sum of all exposures, multiplied by the carbon intensity of the category Utilities, and the second term is similar, for the Financials category.

An example of a counterparty book current exposures (CE) carbon intensity index includes the example of a counterparty book including three companies, with two utilities and one financials. The Owning institution may have multiple positions and/or trades with a single company. The current exposure (CE) of a position may be the larger of zero, or the market value of the transaction with a counterparty that would be lost upon the default of the counterparty, assuming no recovery on the value of the transaction in bankruptcy. The CBs are associated with the trading book but are different from the delta exposures mentioned above. A hypothetical CE trading book portfolio is shown in Table 4:

TABLE 4

| Company Name | Position ID | GICS Sector | Current Exposure (CE) |
|---|---|---|---|
| Company ABC | 39263319 | Utilities | 5000 |
| Company ABC | 39263320 | Utilities | −1000 |
| Company DEF | 39663318 | Utilities | 2000 |
| Company XYZ | 39200211 | Financials | 3000 |
| Company XYZ | 39200212 | Financials | 1000 |

In the following example application of Formula 1, the first term is the sum of three CE exposures in the Utilities category divided by the sum of all exposures, multiplied by the carbon intensity of the category Utilities, and the second term is similar, for the Financials category:

$$\frac{5000-1000+2000}{10000} * 3260 + \frac{3000+1000}{10000} * 50 = 1976$$

In options trading, delta refers to a change in the price of an option contract per change in the price of the underlying asset. Gamma refers to the rate of change of delta. A delta may measure the theoretical change in premium for each $1 change in the price of the underlying asset or security. Table 5 below shows example deltas for example asset classes:

TABLE 5

| Asset Class | Definition |
|---|---|
| CM | P&L per 100% move in underlying price/volatility |
| CR | P&L per 1 bps move in underlying price/volatility |
| EQ | P&L per 100% move in underlying price/volatility |
| FX | P&L per 100% move in underlying price/volatility |
| IR | P&L per 1 bps move in underlying price/volatility |

Figure 2:
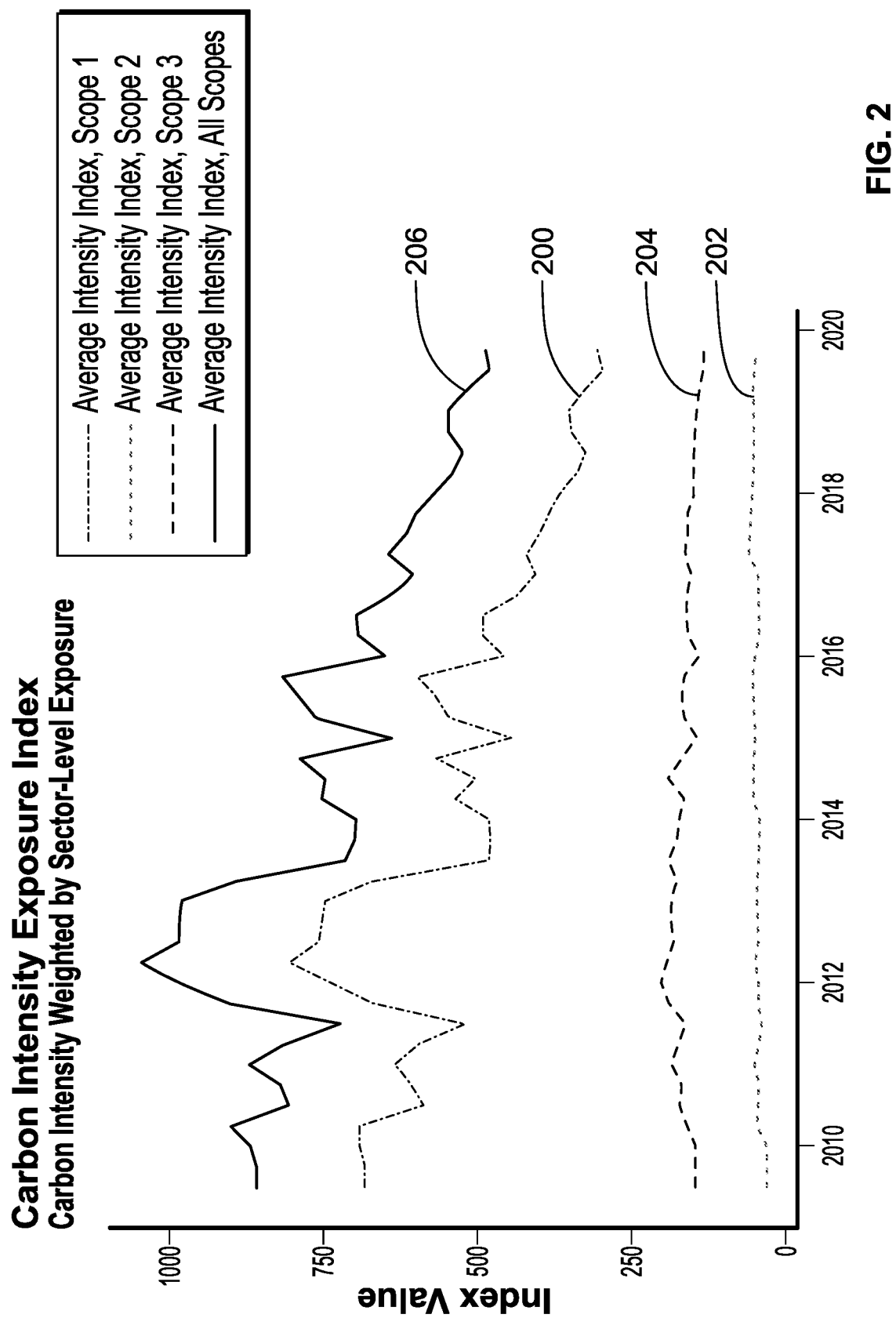
FIG. 2 depicts a display, e.g., presented to a user, showing carbon emissions risk such as a Carbon Intensity Index calculated over time for an institution, according to embodiments of the present invention.

FIG. 2 depicts a display, e.g., presented to a user, showing carbon emissions risk such as a Carbon Intensity Index calculated over time for an institution, according to embodiments of the present invention. Referring to FIG. 2, a Carbon Intensity Index is calculated by a system (e.g., server 10), and displayed for each of Scope 1 (line 200), Scope 2 (line 202) and Scope 3 (line 204), and all three scopes added or aggregated (line 206). The X axis is time and the Y axis is the index value: an index value may be the same units for carbon intensity, for example using tonnes carbon (in a year)/$mm revenue/time period (e.g., a year). The data depicted in a display such as in FIG. 2 may be calculated according to Formula 1 above, but also can be calculated according to Formula 2 above (such that the Y axis measures exposure (in currency)*carbon emissions/revenue (in currency)*time period (e.g., year), or other measures. As with other graphs discussed herein using Scopes 1, 2 and 3, data may be displayed individually as one of scopes 1, 2 and 3 or an addition of Scopes 1, 2 and 3.

Figure 3:
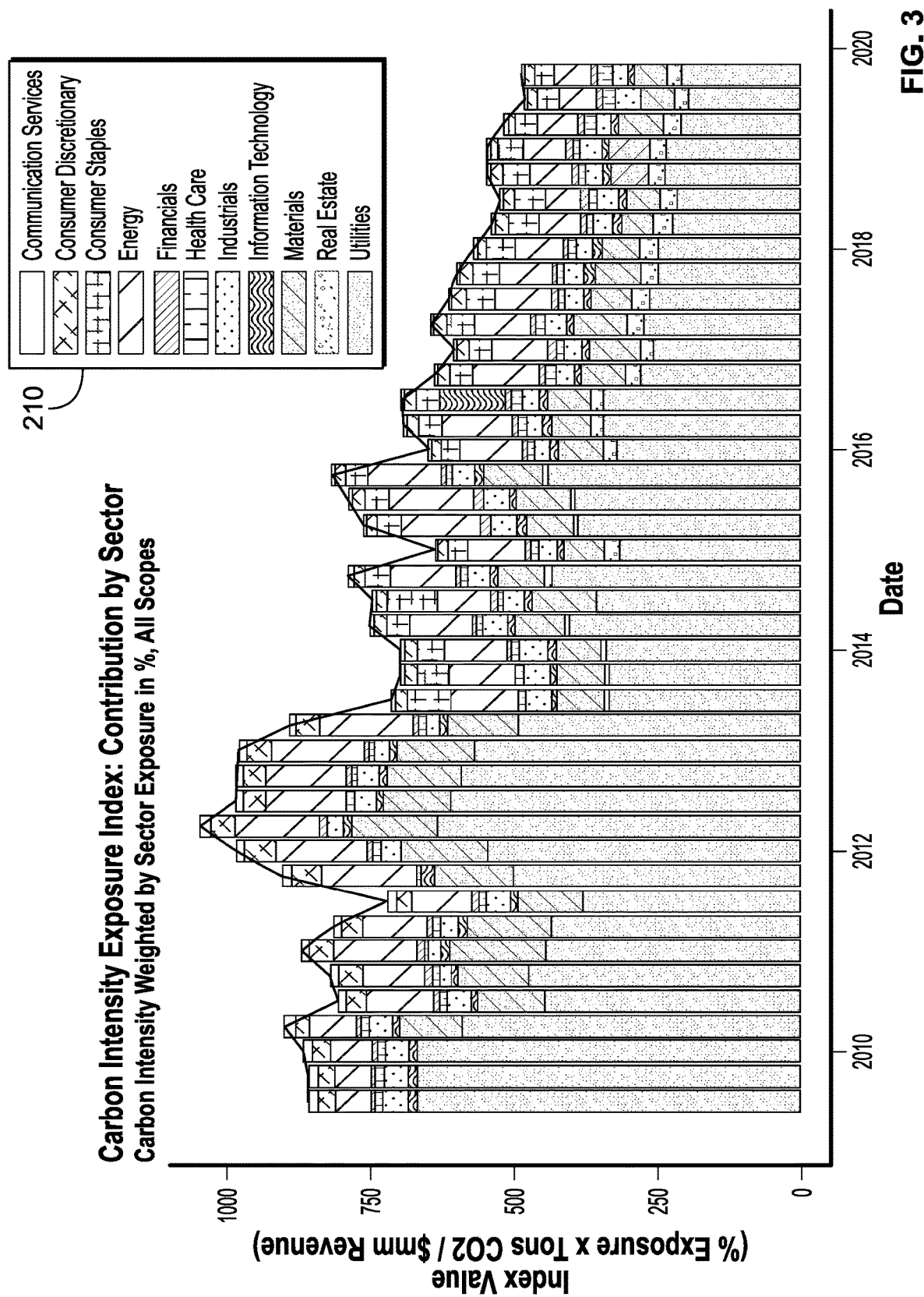
FIG. 3 depicts a display, e.g., presented to a user, showing a carbon intensity by industry calculated over time for an institution, according to embodiments of the present invention.

FIG. 3 depicts a display, e.g., presented to a user, showing carbon intensity by or per industry calculated over time for an institution, according to embodiments of the present invention. Referring to FIG. 3, a Carbon Intensity Index is divided among different industries or sectors 210 (e.g., utilities, real estate, materials, information technology, etc.) across time along the X axis. The Y axis is the index value, such as percentage exposure×tons of CO2/$ million revenue/time period. FIG. 3 is calculated according to Formula 1 described herein, but also can be calculated according to Formula 2 described herein (such that the Y axis measures percentage exposure×carbon emissions/time period (e.g., year), or other measures. Mapping of carbon emissions and exposure data and aggregation of exposures may be also performed for trading counterparty current exposures and trading book delta exposures, in addition to for lending exposures. Attachment of exposures to carbon emissions at the company level may be performed for counterparty trading book exposures.

The display of graph of FIG. 3, and other displays shown herein, may be adapted to display carbon intensity measures by sector based on assets, investments or exposures other than those depicted in FIG. 3. For example, an embodiment may calculate and display a graph such as that shown in FIG. 3, but with carbon exposure based on other exposures such as trading book exposures such as CE, CM, EQ, FX, interest rate, CR; or deltas or other "greeks", or other exposures discussed herein.

Figure 4:
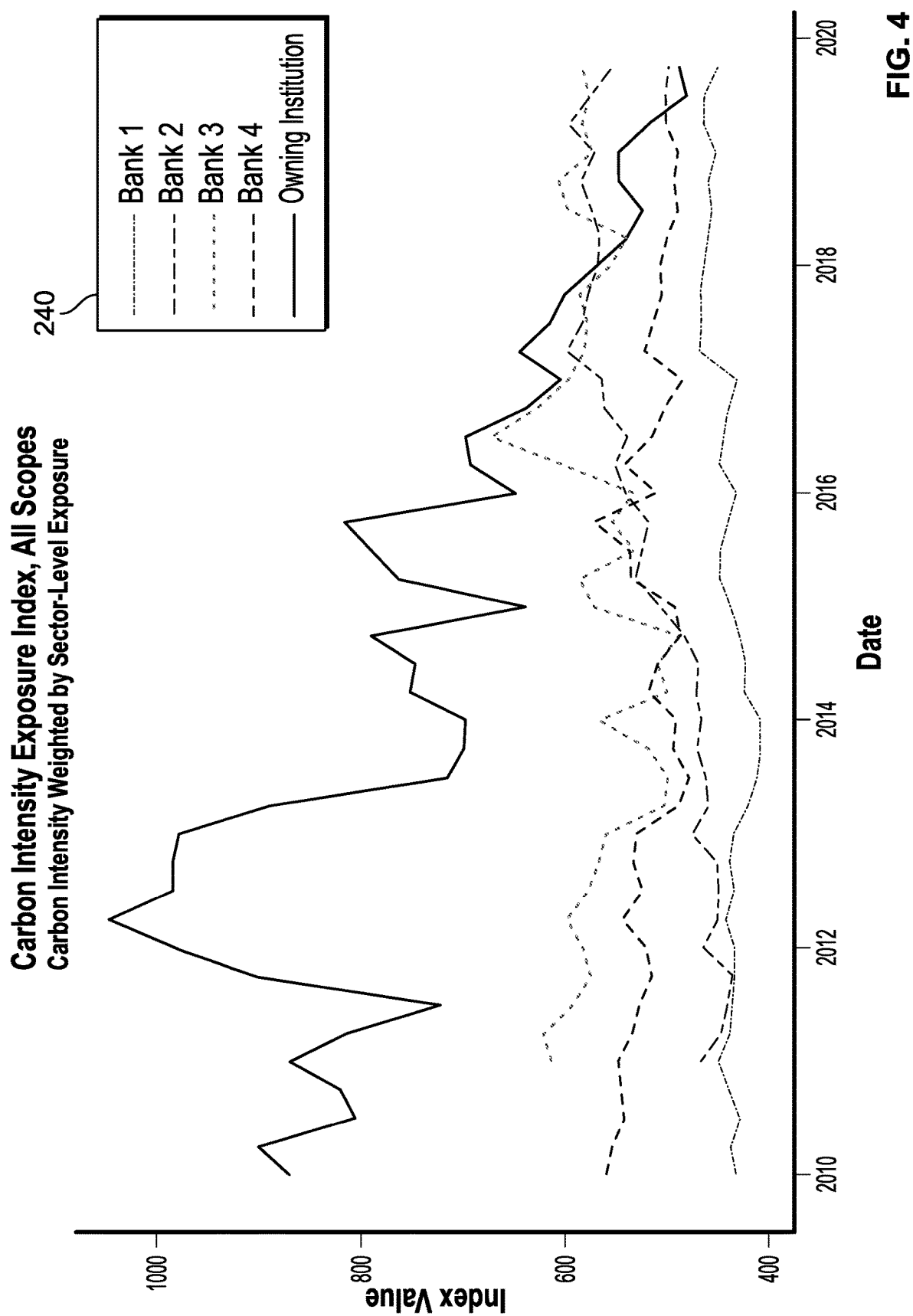
FIG. 4 depicts a display, e.g., presented to a user, showing a Carbon Intensity Index calculated over time comparing institutions, according to embodiments of the present invention.

FIG. 4 depicts a display, e.g., presented to a user, showing a Carbon Intensity Index calculated over time comparing institutions, according to embodiments of the present invention. The X axis depicts time and the Y axis depicts carbon intensity, according to Formula 1 above, in units such as tons or tonnes of carbon/unit of revenue (e.g., millions of dollars)/time period (e.g., year). Other formulas, such as Formula 2 above, or other formulas, may be used. Various institutions 240 may have carbon intensity data presented. In some embodiments, data may be gathered by an automatic process from, e.g., an SEC source 5 maintained by the SEC, providing sector-level credit lending exposures of institutions other than and/or including the owning institution, such as 10-Q/K filings, e.g., the commercial credit exposure section of such filings. An automatic process, e.g., executed by server 10, may read (and digitize or use optical character recognition, if the source data is not computer readable) and, for each institution, extract lending exposure by sector. In this manner public information from the SEC or other filings may be used to construct carbon intensity indexes for peer institutions among institutions 240.

Displays of data, and individual data, may be broken down by, or displayed by, various factors. For example, a counterparty's rating (e.g., a bond rating, such as B-rating, AA rating, etc.) may be used to divide data. Mean or median data, e.g., from Trucost as categorized by GICS or another chosen division factor, may be used as proxy data, and displays may include one or the other or both. Calculating proxy data may include calculating carbon emissions data for the industry in which a counterparty is a member and assigning the proxy carbon emissions data to the counterparty.

An embodiment may calculate exposure for an institution as the ratio of a) the amount of loans by the institution to a counterparty (e.g., "investment"), to b) the investee equity plus investee debt; this may be multiplied by the carbon intensity of the counterparty. In one embodiment, for each counterparty a process may determine the carbon emissions risk to the institution by multiplying the carbon emissions data for the counterparty to the exposure or investment of the institution to the counterparty, and dividing the exposure or investment by the sum of the equity of the counterparty and the debt of the counterparty. A Financed Emissions Index may use exposure and measure the amount of carbon emission sponsored indirectly by an institution or lender through its financing activities, and may be defined by Formula 4:

Financed Emissions=$\Sigma_i$ Investment$_i$/(Investee Equity$_i$+Investee Debt$_i$)×Emission of Investee$_i$    Formula 4

Investment$_i$ may be the lending exposure of the institution to counterparty i. Investee Equity$_i$+Investee Debt$_i$ may be the total capital of counterparty i, the sum of the counterparty's total equity and debt. Emission of Investee may be taken from an external database such as the Trucost database, and may be the total carbon emissions per year or other time period by the investee, not taking into account revenue of the investee, making Emission of Investee$_i$ typically different from Carbon Intensity$_i$. If a database such as Trucost does not have Emission of Investee for a counterparty i, it may be approximated by, for example, by calculating the mean or median of the carbon emissions of the companies within the industry of investee or counterparty i. By taking the ratio between investment and total capital, the formula may calculate the portion of the company's operation that is sponsored by the institution. Multiplying that ratio by Emission of Investee$_i$ (a measure of emissions of the investee or counterparty, for example obtained from vendor carbon emission data, e.g., Trucost, and being in units of for example tonnes of carbon per year) produces Financed Emission for counterparty i. Aggregating or adding, using the factor i, across all counterparties, produces the Financed Emission for the institution.

Companies or counterparties may not have data provided by a service such as the Trucost service. Embodiments may calculate or impute an estimate for such counterparties by assigning the counterparty to an industry for which a carbon emissions number has been calculated (e.g., tonnes of carbon per year), and assigning that industry's emissions number to the counterparty as a proxy for actual data on the counterparty. For each company lacking emissions data, the company's industry is located. Carbon emissions data from the industry may be obtained, for example from the Trucost service, divided by or indexed by GICS categories. Each industry may include a range of companies and a distribution of carbon emissions. One statistic from the distribution may be selected as a proxy for the missing carbon emission data point to be assigned to the company: in one embodiment the mean and median statistics are offered to a user to select, or both mean and median may be used. There may be different levels of industry sectors and statistics from the distribution that can be used. For example, four levels of GICS industry may be used, and mean and median (e.g., the mean and median of actual data for the industry or sector from Trucost) may be used as appropriate proxy statistics. In one embodiment, the mean for GICS level four (sub-industry) is used for such an approximation, but other levels may be used. It has been observed by the inventors that using the mean of the distribution as a proxy may significantly inflate the financed emission number. The reason is that within each industry, whether it is GICS1 or GICS4, the distribution of carbon emissions is skewed to the right, leading to a higher mean than median. In some embodiments, proxy data may be based on one level (e.g., GICS4 industry) but may be aggregated to another level (e.g., GICS1 level) before display to a user.

In one embodiment, a weighted average to be used as a proxy may be calculated instead of received from an external database such as the Global Industry Classification Standard (GICS) industry taxonomy developed by MSCI and S&P. An approximation of data for a company whose carbon emissions data cannot be found on a database such as Trucost (e.g., a "missing company") may be found by: assigning each company that is found in the relevant carbon database to an industry; determining carbon data to each industry defined in an institution's data by computing a weighted average or median value over companies' carbon data for each industry; and assigning carbon data to each missing company as being equivalent to the weighted average carbon data for the industry for the missing company. The weighted average may be calculated as a mean or median over all companies' data used as input, and one or both may be used. The approximated carbon emission data may be based on the Trucost data, using the mean or median value ("statistics") of an industry's carbon emission to approximate the carbon emission of a company from that industry when its name-level information is not available. For example, if company XYZ is a company in the Energy sector that the institution lends to, and the institution has XYZ's financial information (e.g., equity+debt), but not its carbon emission data, to calculate the institution's financed emission by lending to Company XYZ, its carbon emission may be approximated by either the mean or median of the carbon emissions of all Energy sector companies for which the owning institution does have access to data.

To create a Financed Emissions Index, company-level exposure data (e.g., the investment factor in Formula 4) which may be internally stored at an institution may be mapped to the companies' financial data, e.g., equity and debt, also for example internally stored at an institution. A ratio may be calculated for each company to which the institution lends, or transacts in the context of trading and counterparty derivative exposures which represents the proportion of its carbon emission the institution is financing.

This same company's carbon emission information (e.g., Emission of Investee) may be looked up directly or imputed from the Trucost carbon emission dataset. In one embodiment, mapping of the company may be performed by a database internal to an institution which may cross-reference companies' identifiers with standard data such as the International Securities Identification Number (ISIN) given in the Trucost carbon emission data. Financed emission components may be added or aggregated across the institution's counterparties to arrive at the Financed Emission Index.

An optimization or modelling embodiment may alter an institution's modelled (as opposed to actual) holdings—e.g., the amount invested in each counterparty, sector, industry, etc. or the amount of certain exposures—to allow an institution to alter its exposures to reach a target. For example, a bank may set limits for the amount of emissions it will finance from counterparties or sectors. With the optimization methodology, this can be achieved over a specified horizon. The time horizon can be modified to reflect long-term goals (e.g., compliance with the 2050 Paris Accord) or shorter business planning horizons. Carbon emissions risk for a number of counterparties may be modelled by, for at least one counterparty, altering the exposure of the counterparty (e.g., the actual data, to produce modelled data) and re-determining the carbon emissions risk to the institution for that counterparty. Updated data may then be displayed to a user, who may then act on the model to reduce, shift or alter the actual portfolio exposure. A financed emission optimization methodology can be leveraged to provide guidance on portfolio strategies to reduce an institution's financed emissions over time. This can be important in setting targets or limits that can help the institution to achieve agreed upon levels of carbon financing in keeping with principals outlined in the Paris Agreement. An institution's portfolio strategy can be optimized so that its financed emission amount is minimized over time while the portfolio still meets certain criteria. These criteria can be modified to consider overall portfolio returns or profitability along with other financial metrics.

In an optimization or modelling process altering the exposure of a counterparty may be subject to constraints such as:

The size of the entire lending or trading portfolio cannot be lower than a given threshold, that is, a business plan may specify that the portfolio should grow at a given rate over time; and The exposure to any one counterparty cannot change more than a given percentage in any one period (this could be in keeping with contractual or other commitments).

Other constraints may be used. Since the financed emission of a bank is determined by not only the portfolio size, but also the portfolio mix, the portfolio can essentially be redistributed over time to meet optimization goal(s).

The financed emission of a portfolio may be calculated using example Formula 5 below, similar to example Formula 4 above.

$$\text{Financed Emission} = \Sigma_i \, (\text{Counterparty Exposure}_i) / (\text{Counterparty Equity}_i + \text{Counterparty Debt}_i) \times \text{Emission of Counterparty}_i \quad \text{Formula 5}$$

Formula 5 may aggregate or add financed emissions for each counterparty i for an institution. Assuming that the equity, debt and emissions of a counterparty remain stable over time, the financed emission amount related to a counterparty is solely determined by the institution's exposure to that counterparty. In this sense, the financed emission formulae can be reinterpreted as in example Formula 6:

$$\text{Financed Emission} = \Sigma_i \, \text{Counterparty Lending Exposure}_i \times \text{Financed Emission Rate of Counterparty}_i \quad \text{Formula 6}$$

Where the "Financed Emission Rate" may be defined for example as in Formula 7:

$$\text{Financed Emission Rate of Counterparty}_i = \text{Emission of Counterparty}_i / (\text{Counterparty Equity}_i + \text{Counterparty Debt}_i) \quad \text{Formula 7}$$

To minimize the overall financed emission amount for future modeled time periods, lending exposures in a model (rather than in the real world) may be moved from the counterparties with high financed emission rates to those with low financed emission rates. Such modelling a carbon emissions risk for a number of counterparties may be performed for at least one counterparty, altering or modifying the exposure to the counterparty and re-determining the carbon emissions risk to the institution for that counterparty after the exposure alteration. This may be performed automatically by a system such as in FIG. 1, performing a computer modelling process. In one embodiment, all counterparties relevant to an institution are rank-ordered by their financed emission rate, from low to high. Starting from both ends (lowest rate and highest rate) simultaneously, exposures of counterparties with the highest financed emission rates (at the bottom) are reshuffled, reordered or moved to those with the lowest (at the top). An optimization or modelling process may finish when the two threads meet in the middle (e.g., when the moving current lowest rate is equal or greater than to the moving current highest rate). For example, an optimization or modeling of carbon risk for a portfolio of counterparties may performed (e.g., automatically, by a computer processor) whereby the first ranked counterparty (e.g., associated with highest rate of financed emissions) has its exposure reduced by an amount X that is expressed in a given currency, and that represents a theoretical divestment. Simultaneously, a second counterparty (e.g., with the lowest rate of financed emissions) may have its exposure increased by the same amount. The resulting exposure can be displayed for each counterparty to a user.

The process of lowering the exposures for emitters with high financed emissions rates, and raising the exposures for low financed emissions may continue, e.g., repetitively or iteratively, until the overall financed emissions have been minimized while satisfying the constraint that the overall exposures must be at least as great as the business plan targets.

Such modelling may be performed on other exposures described herein (e.g., CM, IR, delta, etc.) by, for at least one of the exposures, altering the exposure to the institution and re-determining the carbon emissions risk to the institution for that exposure. The altering may be performed by for example reducing a first exposure by a percentage X to result in an amount of reduced exposure, and for a second exposure having lower carbon emissions data than that of the first exposure increasing the exposure by the amount of reduced exposure The optimization of financed emissions may also be performed for a plurality of counterparties. In this example, the financed emission rate can be specified for groups of counterparties and exposures can be raised or lowered for these groups to achieve the same outcome of minimizing financed emissions for the portfolio over the planning horizon subject to constraints on changes within a given time period (e.g., a year or quarter) as well as over the entire horizon.

In the case that no constraint is applied on how much exposure can change for one counterparty, all exposures may be moved to the counterparty with the lowest financed emission rate, rendering the whole portfolio to include only one counterparty. As such, an upper bound of how much any one counterparty's exposure can change in one time period, or other limits, may be set. Thus the highest ranking carbon emitter may have up to a limit of a predefined amount of X % of the exposure to that counterparty transferred to the lowest carbon emitter, and then within the same time period, the process may move exposure away from the second highest carbon emitter, up to a limit of X % of the exposure to that counterparty. A period can be defined in any time interval, such as quarterly, yearly, etc. Similarly, proceeds from the divestment from the high carbon emitter may be added to the lowest carbon emitter up to a point of a threshold X % increase to that low emitter's representation in the portfolio, at which time the second lowest emitter will have funds added to its portfolio, and so on, on to the next lowest emitter. This process may be repeated or iterated for each time period within a projection horizon.

As part of the optimization, the loss rate of the modified portfolio may be output or analyzed to ensure that the profile of the portfolio is consistent with the relevant institution's risk appetite and policy. An example Loss Rate is the ratio between the Expected Loss of a portfolio and the overall size of the portfolio (Loss Rate=Expected Loss/Total Exposure); where Expected Loss, is defined as: Exposure*Probability of Default*Loss Given Default; other measures, including Net Present Value of Cash Flows or expected net profits, may be used. Loss rates may be closely monitored and compared to the loss rate of the original portfolio, in order to ensure that no overly aggressive portfolio strategy will be adopted in which resulting loss rates from executing on the optimization plan yield are beyond the firm's appetite for risk. Further constraints may be applied within the framework to manage overall portfolio returns or profits. An optimization process can be interpreted not only from a counterparty-by-counterparty perspective, but also from a cohort-by-cohort perspective. The cohort can be defined as industry or sub-industry groups to facilitate the execution of the optimized portfolio strategy. The optimization of financed emissions may also be performed for a plurality of counterparties. The financed emission rate can be specified for groups of counterparties and exposures can be raised or lowered for these groups to achieve the same outcome of minimizing financed emissions for the portfolio over the planning horizon subject to constraints on changes within a given time period (e.g., a year or quarter) as well as over the entire horizon.

Various key parameters may be specified for an optimization, for example the upper bound of how much a single counterparty's exposure can change in one period (e.g., in %); the required period-over-period growth rate of the overall size of the lending portfolio (e.g., in %); the number of periods simulated into the future; and the length of each period (e.g., quarters, years or increments of years). Other parameters may be used. The modelling or simulation over time may be displayed.

Figure 5:
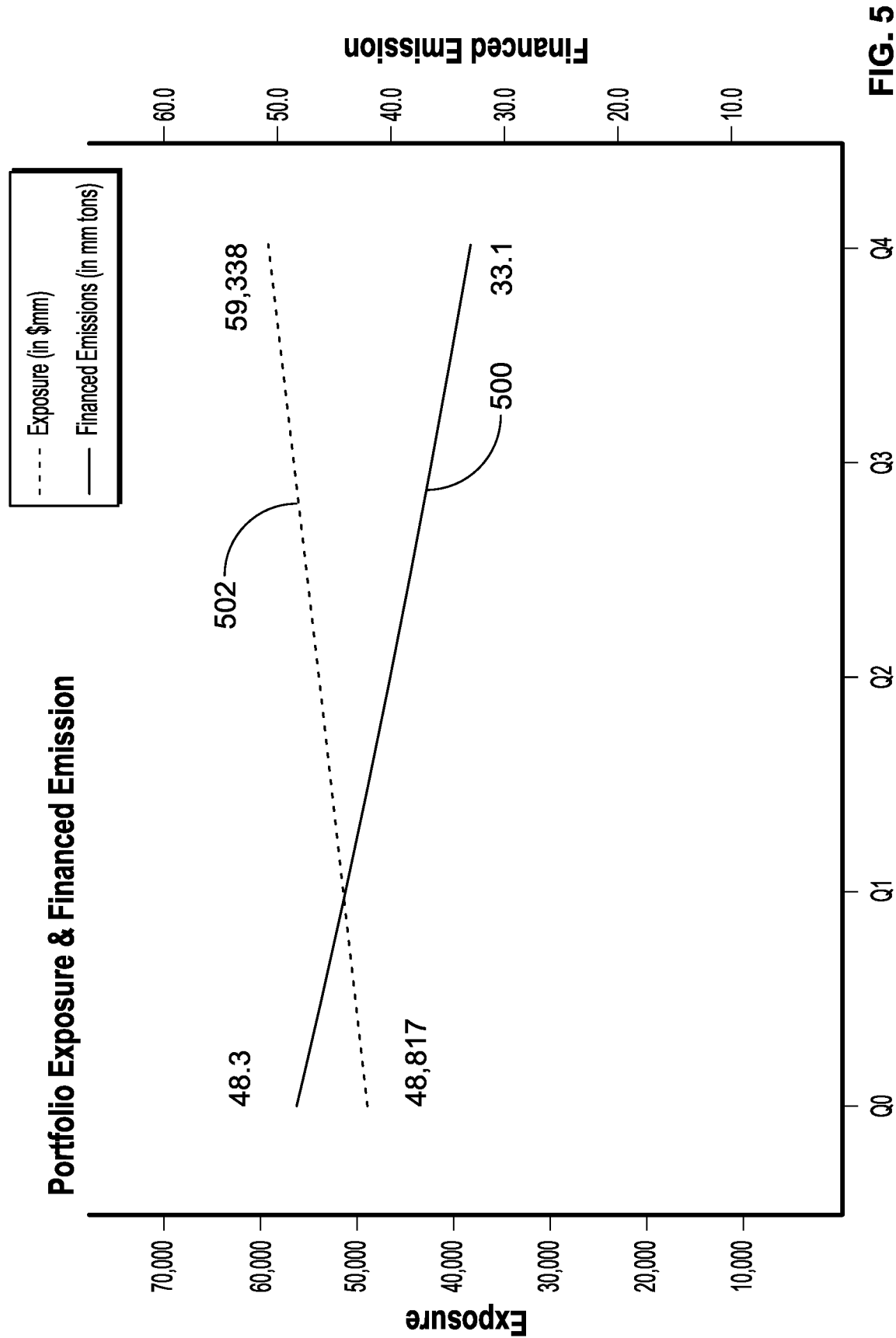
FIG. 5 depicts a display, e.g., presented to a user, showing a model over time of a portfolio as counterparty weights are changed, according to embodiments of the present invention.

FIG. 5 depicts a display, e.g., presented to a user, showing a model over time of a portfolio as counterparty weights are changed, according to embodiments of the present invention. A model to produce the display of FIG. 5 included the example constraints that any counterparty's exposure cannot change by more than 10% within a single period or across periods; the total exposure of the portfolio (e.g., exposures to a number of counterparties for an institution) must increase by 5% by the end of every period reflecting business growth targets for each period; and there are in total, 4 periods, defined in quarters, providing a projection into the future. In FIG. 5 the X axis is time, the left Y axis shows exposure in millions of dollars and the right Y axis shows the financed emissions summed across counterparties in the portfolio, in millions of tons of emitted carbon. Referring to FIG. 5, it can be seen via the downward sloping line 500 that over the 4 periods, the financed emission amount of the portfolio in question decreased from 48.3 mm tons to 33.1 tons, and via the upward sloping line 502 the exposure (e.g., money lent) increased. In this model, the loss rate of the portfolio, e.g., Expected Loss divided by portfolio size, also decreased from 0.4879% to 0.4456%. The optimization shows to the user that the institution is able to reduce its financed emissions, and grow the portfolio from $48B to $59B yet still manage expected losses.

A display to a user may show the portfolio's exposures by sector as well as financed emission by sector, before and after, and during all periods of, the optimization. For example, such an optimization may show most of the financed emission reduction comes from Utilities, Energy, Materials and Industrials, with their sector exposures also reduced. This is intuitive as those sectors have the highest carbon emission as well as carbon intensity, and their business models are reliant on the emission of greenhouse gasses.

A user may view reports showing carbon emissions data and interact with the system for example to operate models. For example, a display may provide a Carbon Intensity Index for the owning institution, possibly in conjunction with financial information such as the owning institution's credit portfolio. A display may provide a Carbon Intensity Index for different institutions including the owning institution compared against each other, with other information such as a comparison of their credit, or other portfolio compositions. A "Carbon Index Scenario Analysis" display may allow a user to change the owning institution's credit portfolio, e.g., manually model, and see how its Carbon Intensity Index is impacted by such changes, to model alternative scenarios. A "Financed Emissions" section may display the financed emission information, e.g., for individual counterparties and for an institution's entire credit portfolio.

Figure 6:
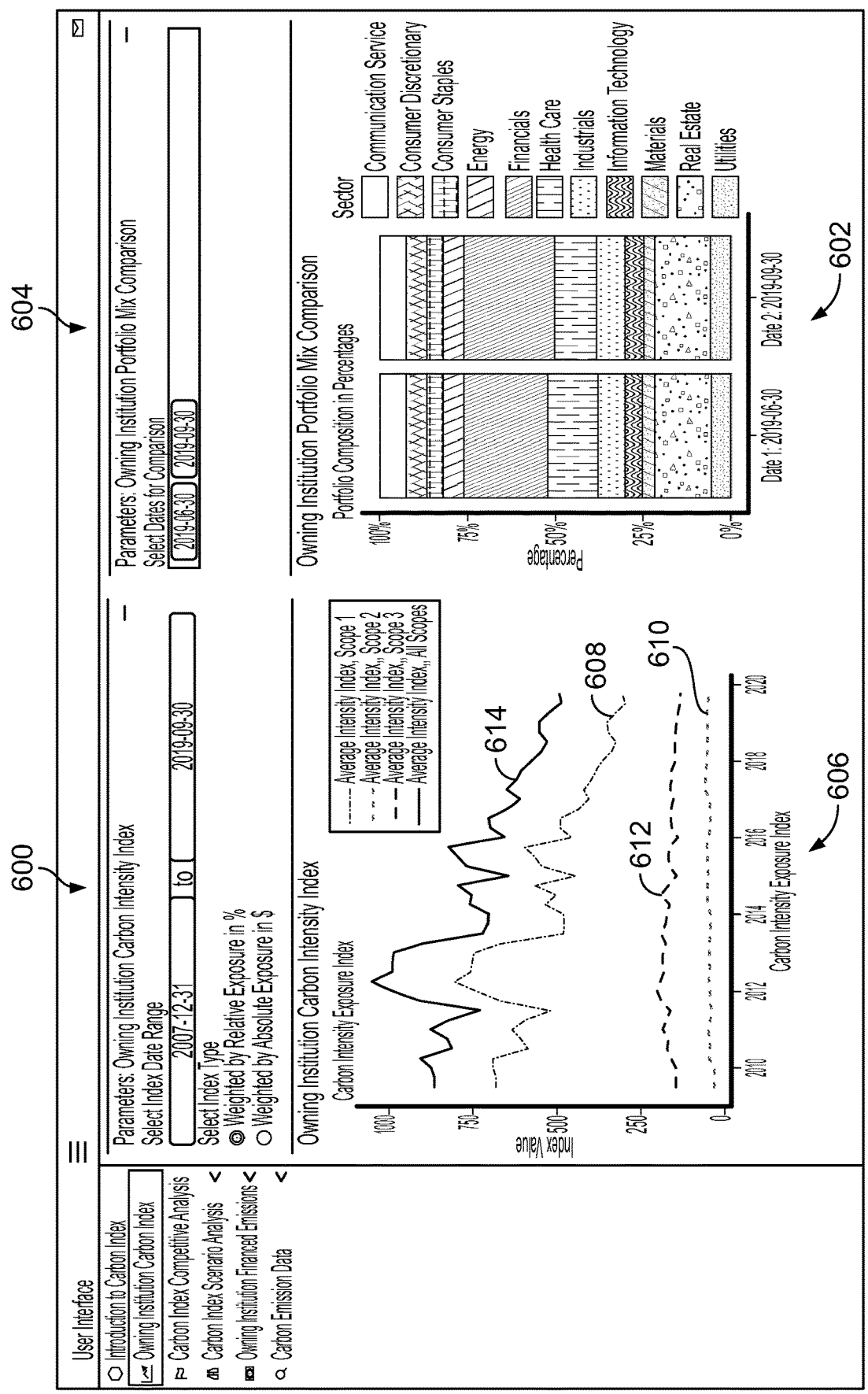
FIG. 6 depicts a display, e.g., presented to a user, showing carbon intensity over time for an owning institution, and other data, according to embodiments of the present invention.

FIG. 6 depicts a display, e.g., presented to a user, showing carbon intensity over time for an owning institution, and other data, according to embodiments of the present invention. In the example shown in FIG. 6, as with other examples described allowing for user input, a user may enter data or selections for example via a GUI (graphical user interface) executed by a computer such as a user terminal 30. Box 600 gives the user options to customize, e.g., via user input to a user terminal, the carbon intensity index calculation, including time range and type of carbon intensity index (e.g., Formula 1 vs. Formula 2). Panel 602 displays the breakdown of the owning institution's credit portfolio by industry, in this example at two points in time, the points in time according to box 604, which enables the user, via user input, to see the breakdown at different points in time, e.g., to select dates. Graph 606 displays carbon intensity over time for the owning institution, for example the institution's entire portfolio or another selection of the owning institution exposures. The X axis represents time, e.g., months or quarters, and the Y axis represents the carbon intensity index value, in units of for example using tonnes carbon (in a year)/$mm revenue/time period (e.g., a year). Line or other marker 608 depicts carbon intensity using Scope 1 data; line or other marker 610 depicts carbon intensity using Scope 2 data; line or other marker 612 depicts carbon intensity using Scope 3 data; and line or other marker 614 depicts carbon intensity Scope 1+Scope 2+Scope 3 data. As with other graphs and data displays discussed herein, the graphs may be interactive, such that a user may provide input to a GUI to zoom in, or hover using a pointing device over a point and have displayed the underlying numerical information related to the lines on the graph, or compare different lines on a graph. The carbon intensity may be depicted weighted by sector, or in another manner. User input may cause a processor (e.g., processors 12 as in FIG. 1) to perform calculations to change the displayed carbon information in graph 606.

The display of graph 606, and other displays shown herein, may be adapted to display carbon intensity measure based on other assets, investments or exposures other than those depicted in FIG. 6. For example, an embodiment may calculate and display a graph such as that shown in graph 606, but with carbon exposure based on other exposures such as trading book exposures such as CE, CM, EQ, FX, interest rate, CR; or deltas (or other "greeks", or other exposures discussed herein.

Figure 7:
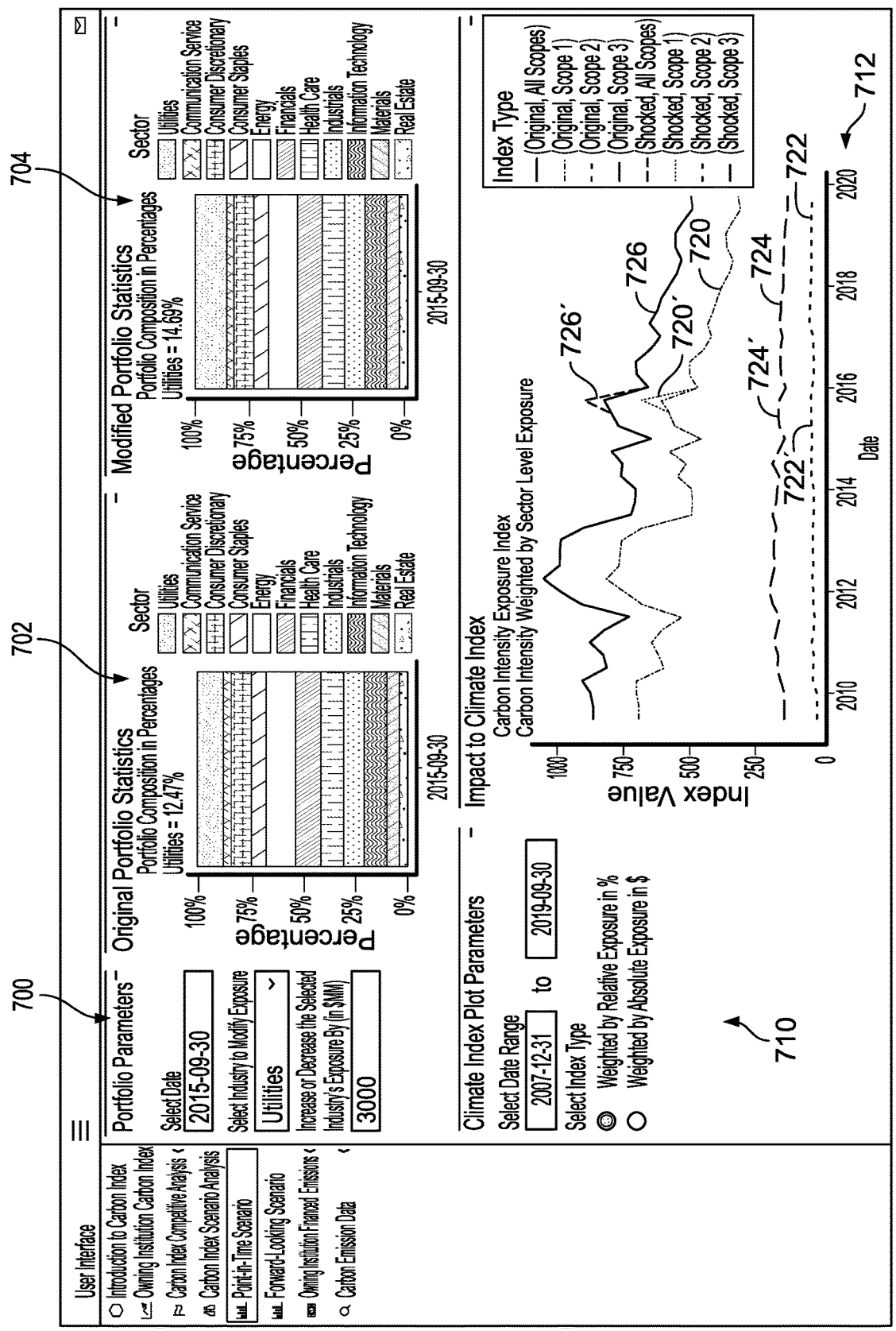
FIG. 7 depicts a display, e.g., presented to a user, allowing modelling of carbon data at a point-in-time, according to embodiments of the present invention.

FIG. 7 depicts a display, e.g., presented to a user, allowing modelling of carbon data at a point-in-time, according to embodiments of the present invention. A scenario analysis or modelling embodiment may allow for example point-in-time and forward-looking options. A point-in-time function may enable users to do what-if analysis based on the owning institution's historical credit portfolio to answer the question: if the portfolio is changed by a certain amount, what is the impact on the owning institution's carbon intensity index? Box 700 gives the user options to change the modelled credit portfolio of the owning institution at user-selectable points in history, selecting which industries (or individual companies or other holdings) to change and by how much, and a date from which to start performing the scenario analysis: the real model is not changed by this process, until and unless, in reaction to a display such as in FIG. 7, an institution changes the actual allocation. User input, as with other figures and functions, may be provided by a user inputting data at a user computer or terminal, and user input may cause a processor (e.g., processors 12) to perform calculations to change the displayed information, such as carbon information in graph 712. After the parameters are selected or input by the user, the boxes 702 and 704 display the portfolio composition of the institution by category (e.g., industry, sector, counterparty, etc.) before and after the change provided by the user in box 700. Box 710 allows the user to choose how to display the modified carbon intensity index series (e.g., Formula 1 vs. Formula 2). The user can choose the time range and type of carbon intensity index.

Graph 712 the carbon intensity index calculated over time as the user specified via user input, for the owning institution, for example the institution's entire portfolio or another selection of the owning institution exposures. Line or other marker 720 depicts carbon intensity using Scope 1 data; line or other marker 722 depicts carbon intensity using Scope 2 data; line or other marker 724 depicts carbon intensity using Scope 3 data; and line or other marker 726 depicts carbon intensity Scope 1+Scope 2+Scope 3 data. The portions of the lines after the time corresponding to the date input in box 700 represents shocked data, e.g., updated carbon intensity index values given the specified portfolio exposure change at the specified date. Line portions 720', 722', 724' and 726' represent shocked data for a point-in-time scenario analysis, where the dollar exposure change selected in area 700 ($3,000 mm in this example) is an instantaneous shock to the portfolio as of the selected date, but which does not alter the portfolio profile of any other dates. The X axis represents time, e.g., months or quarters, and the Y axis represents the carbon intensity index value, in units of for example using tonnes carbon (in a year)/$mm revenue/time period (e.g., a year).

A forward-looking scenario or model may enable users to perform scenario analysis on a forward-looking, in time, basis. The user can specify the owning institution's portfolio composition in the future, for example, in the upcoming four quarters. Based on the user specified portfolio, a system (e.g., as in FIG. 1) may calculate the owning institution's carbon intensity index in the selected time period—e.g., the upcoming year. The user may be able to specify how the exposure for one sector changes, or how exposures for all sectors change. A forward-looking carbon intensity index may be calculated using the last available carbon intensity in the relevant data, such as the Trucost data.

Figure 8:
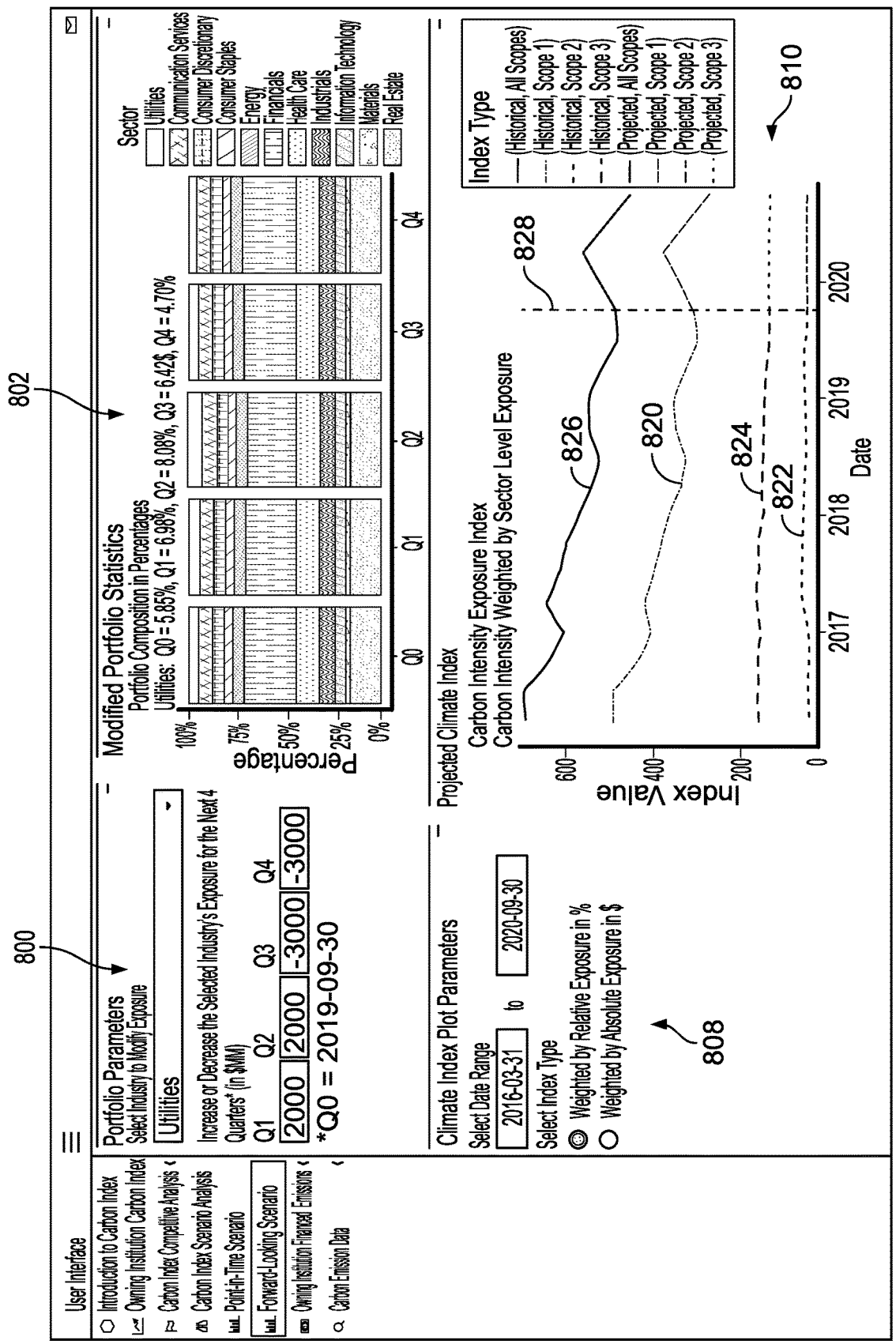
FIG. 8 depicts a display, e.g., presented to a user, allowing modelling of carbon data over future time periods, according to embodiments of the present invention.

FIG. 8 depicts a display, e.g., presented to a user, allowing modelling of carbon data over future time periods, according to embodiments of the present invention. In box 800 a user can input or specify how a model of an owning institution's portfolio changes or evolves over a future period, e.g., the upcoming year. For example the user may be able to specify to which sector or counterparty to apply the changes (or to the entire portfolio), and also by how much in each period such as quarter; the processor may calculate the changes, the calculations may be performed e.g., by server 10, and the carbon exposure over time may be displayed in area 810. For example, a user may enter exposure changes in, e.g., positive or negative currency values (e.g., $mm), or percentages, in a field for each time period in box 800 to reflect increase or decrease in exposure, and the selected sector or counterparty would have its holdings in the owning institution's modelled (not actual) portfolio changed by the entered dollar amount or percentage for each time period. For example, if sector industrials is selected, and in quarter 1 of the upcoming year 5% is selected, the display in area 810 will show the carbon measurement (e.g., Carbon Intensity Index) resulting from an increase of 5% in the modelled portfolio during that time period.

A display area 802 may display portfolio composition over the upcoming time period, e.g., in the next one year. Based on the user selected changes per period in area 800. In one embodiment the composition is broken down by sector, in other embodiments other divisions may be used.

Box 808 allows the user to choose how to display the modified carbon intensity index series (e.g., Formula 1 vs. Formula 2). The user can choose the time range and type of carbon intensity index. Graph 810 shows the carbon intensity index calculated over time as the user specified via user input, for the owning institution, for example the institution's entire portfolio or another selection of the owning institution exposures. Graph 810 shows the carbon intensity index calculated over time as the user specified via user input, for the owning institution, for example the institution's entire portfolio or another selection of the owning institution exposures. Line or other marker 820 depicts carbon intensity using Scope 1 data; line or other marker 822 depicts carbon intensity using Scope 2 data; line or other marker 824 depicts carbon intensity using Scope 3 data; and line or other marker 826 depicts carbon intensity Scope 1+Scope 2+Scope 3 data. The portions of the lines after the time marked 828 represent projected data, as opposed to the real data shown up to time point 828. The X axis represents time, e.g., months or quarters, and the Y axis represents the carbon intensity index value, in units of, for example, using tonnes carbon (in a year)/$mm revenue/time period (e.g., a year).

The display in graphs 712 and 810 may display Carbon Intensity Index (e.g., formulas 1 and 2 above) but may display other measures of carbon emissions.

A scenario analysis tool as depicted in FIG. 8 can be leveraged to project the impact of an optimized portfolio strategy on the Carbon Intensity Index of a bank. In facilitating these types of what-if analyses, it lends insight into the future climate risk profile of a bank given a hypothetical portfolio strategy.

In another example the user may specify how much in each period such as quarter to adjust a model automatically, and iteratively over one or more future periods. For example, a user may enter a certain percentage, such as 5%, by which the holdings in the most carbon intensive sector or counterparty is reduced in a modelled portfolio in each time period (typically up to a limit reduction in that portfolio, e.g., as a percentage reduction limit), with an equivalent dollar amount to the amount being divested from the high carbon emitter being added to the least carbon intensive sector or counterparty during that period (typically up to a limit). For example, if in quarter 1 of the upcoming year sector A emits the most carbon per dollar of revenue and sector B emits the least carbon per dollar of revenue, in quarter 2 the holdings for sector A would be reduced by 5% and the resulting theoretical proceeds from the sale would be invested in to sector B. Each reduction (e.g., divestment) and addition may be up to a threshold or limit percentage, at which point the addition process moves to the next lowest carbon emitting sector, and the reduction process moves to the next highest carbon emitting sector, according to which limits are reached. The changes may be displayed in area 810. Such an embodiment may provide information to a user telling the user how and where to divest or invest to improve a real-world portfolio's carbon exposure over time.

An embodiment may calculate and display financed emissions (e.g., based on Formula 4). A Distribution Analysis may display to a user to see the financed emission of a specific counterparty of the owning institution and for example how it compares with companies of the same industry. An Attribution Analysis may give breakdowns of an owning institution's financed emission by different criteria.

Figure 9:
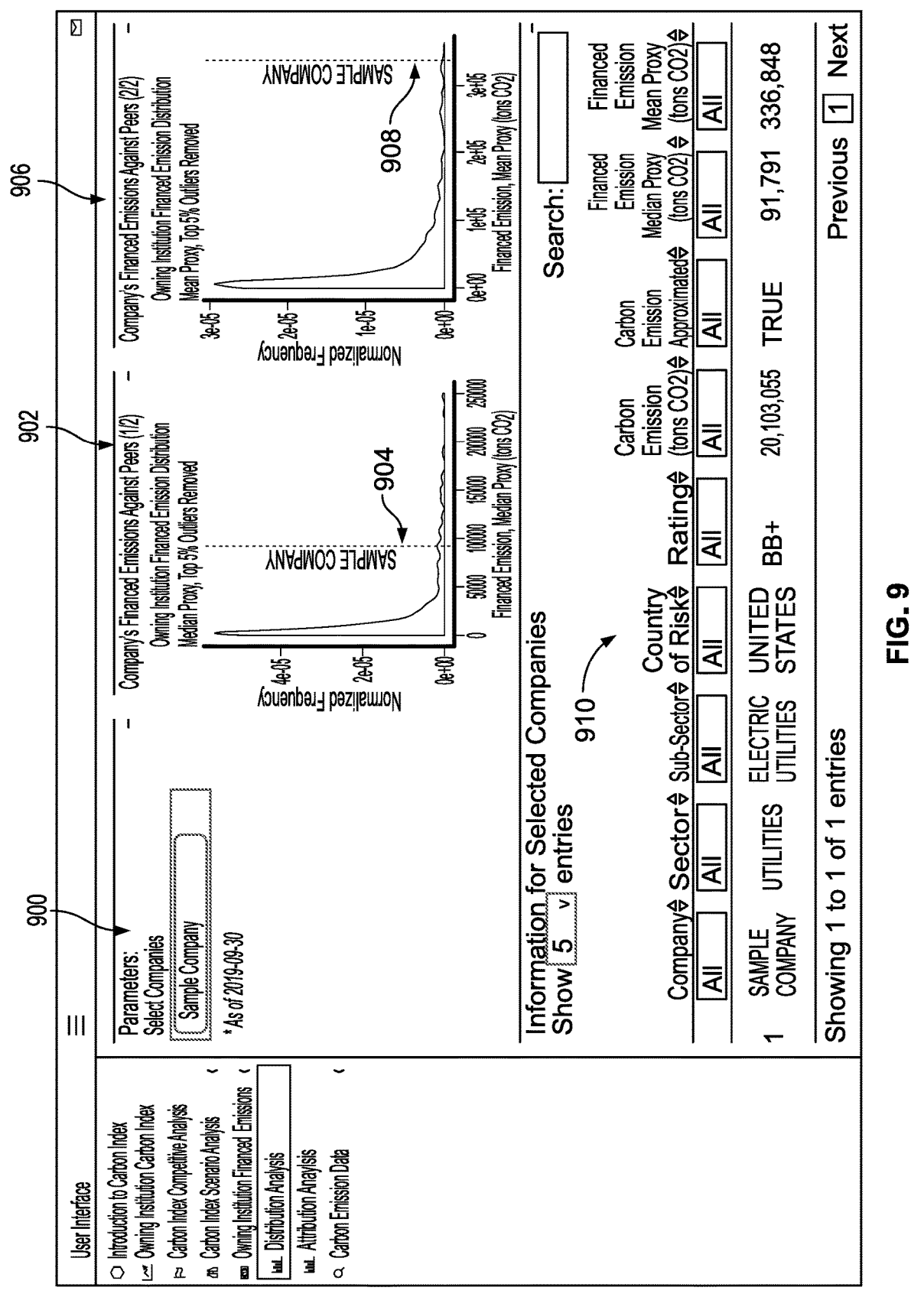

FIG. 9 depicts a display, e.g., presented to a user, allowing a Distribution Analysis calculation and display, where a user analyzes the financed emission of a specific counterparty of an institution, according to an embodiment of the present invention. The display as in FIG. 9 allows display of carbon emissions risk, e.g., financed emissions, for a plurality of counterparties as a normalized distribution, indicates a point on the distribution corresponding to a selected counterparty. A user may input or specify a specific counterparty in area 900, for which a system such as that in FIG. 1 may perform calculations, and it may be displayed to the user where that counterparty lies in a distribution of financed emissions for example within the counterparty's industry compared to other counterparties in that industry and possibly also in or limited to the owning institution's portfolio.

In the case that the selected company has no emissions data (e.g., the company is not listed in the Trucost database), the data may be proxy data, in which case whether the data is mean or median based may be user-selected and/or displayed and proxy data will be displayed. Graph 902 depicts an example financed emission distribution using a median proxy for all companies in the sector of the counterparty selected in area 900 (and possibly also limited to companies in the owning institution's portfolio), and includes line or other marker 904 showing where the selected company falls in the distribution. The X axis in graph 902 shows the financed emission in tons CO2, for example per Formula 4 above, using the median proxy as an input. The Y axis depicts a normalized frequency of counterparties corresponding to the data at the specific point on the X axis; the Y axis data may be a histogram, normalized representation of number of companies that in a certain data bin. In the case that the selected company does have known, actual emissions data, actual emissions data will be used. However, even if known emissions data is used, typically separate mean and median displays in graphs 902 and 906 (instead of one display showing the selected company compared with industry peers) may be shown, as peer data typically includes some companies with proxy as opposed to known data. In some embodiments, even if peer data includes proxy data, one combined graph may be shown.

Graph 906 depicts an example financed emission distribution using a mean proxy for all companies in the sector of the counterparty selected in area 900 (and possibly also limited to companies in the owning institution's portfolio), and includes line or other marker 908 showing where the selected company falls in the distribution. The X axis in graph 906 shows the financed emission in tons CO2, for example per Formula 4 above, using the mean proxy as an input. The Y axis depicts a normalized frequency of companies falling within the emissions levels shown by the X axis.

Area 910 may show more detailed information for the specified company, for example including its sector, country, rating, carbon emission, financed emission, and whether the emission data is proxy/approximated or not (e.g., if the data is from Trucost it is not approximated).

Other analyses and displays may be provided to a user. An Attribution Analysis may provide a user with an institution's financed emission by different criteria, for example sector, industry, counterparty, etc. Financed emissions or other carbon emissions measures produced by the selected criteria entities may be displayed, along with data supporting emissions graphs. For example, if sector is selected as an attribution type criteria, the amount and proportion (e.g., in a graph) of each sector's financed emissions (or another criteria) may be displayed, for example using both a mean proxy and a median proxy, or based on actual data.

A user may search by company, industry, or other grouping to look up the carbon emission data for a specific company, industry, or other grouping, and choose what Scope of carbon emission to be displayed (e.g., Scopes 1, 2 or 3, or all Scopes), and a time range (e.g., two dates defining a range). A graph may be displayed showing the selected company's (or industry, etc.) carbon emission over the time range, possibly compared to the industry average for the industry including the company. Detailed data supporting the graph may also be displayed.

A Distribution Analysis may display to a user the carbon intensity relevant to one company. Such a display may show for a given counterparty or company how it compares with its peers in terms of carbon emission and carbon intensity. In such a GUI or display a user may choose the company, Scope (e.g., Scopes 1, 2 3 or all) of carbon emission and carbon intensity, and time range or at which point of time the comparison should be based on. A user may enter sector and country, or other category definitions, to define the population of the peer companies. A display of graphs may demonstrate how the company at issue performs relative to its peers by, for example, absolute or total carbon emissions, or intensity distribution, with the X axis indicating where on a distribution (e.g., a normalized distribution) the selected company falls, with a line or other marker indicating where the company falls, and the Y axis depicts frequency within a normalized distribution. For example graphs depicting carbon emissions and carbon intensity may be provided.

Figure 10:
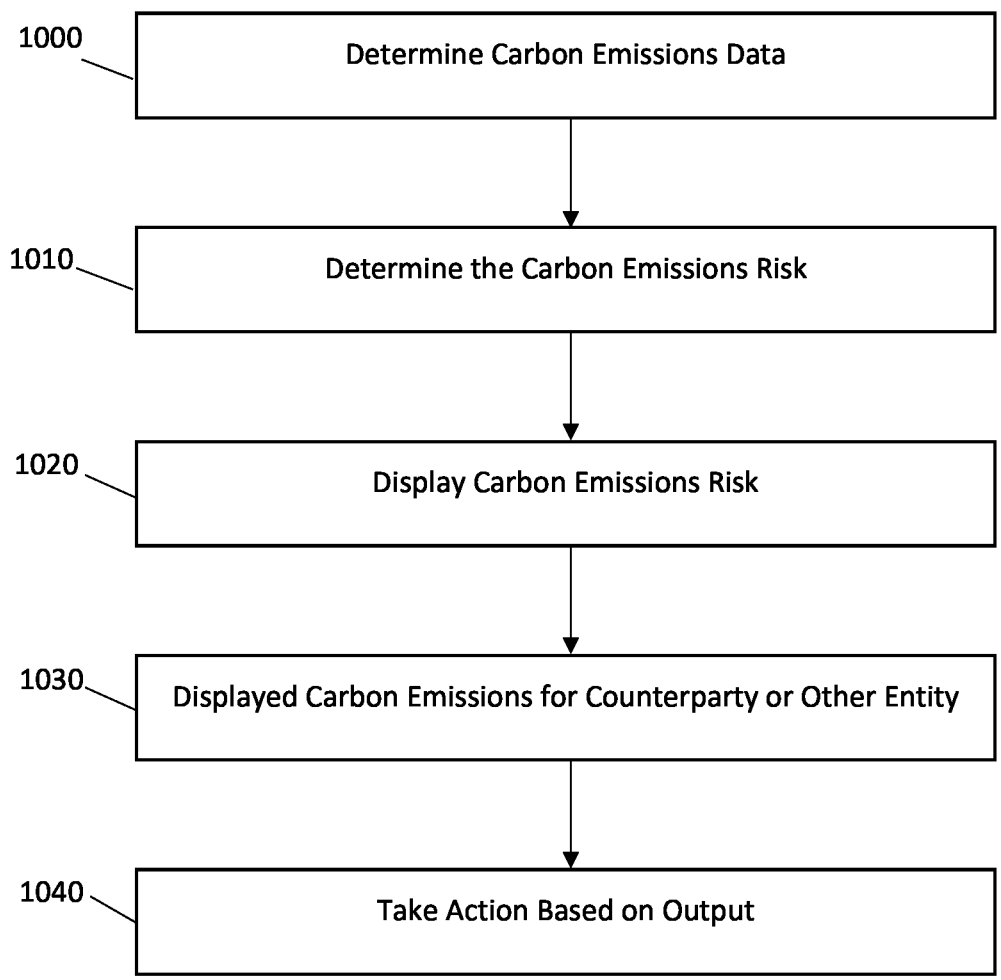
FIG. 10 shows a flowchart of a method according to embodiments of the present invention.

FIG. 10 shows a flowchart of a method according to embodiments of the present invention. The operations of FIG. 10 may be performed by the system shown in FIG. 1, but other systems may be used.

Referring to FIG. 10, in operation 1000, a process may determine carbon emissions data for one or more counterparties or other entities or holdings (e.g., equity position, FX position, etc.), e.g., by accessing a database such as Trucost or by approximating data for certain companies. In an alternate embodiment, emissions data may be determined which corresponds to exposures other than counterparties, such as interest rates or commodities.

In operation 1010 for each counterparty, exposure or other entity, or holding (e.g., equity position, FX position, etc.), a process may determine the carbon emissions risk to the institution by for example multiplying the carbon emissions data for the counterparty by the exposure of the institution to the counterparty. The exposure or risk may be divided by the exposure by the total amount of loans made by the institution. The exposure or risk may be divided by the sum of the equity of the counterparty and the debt of the counterparty.

In operation 1020 carbon emissions risk over time may be displayed, e.g., based on one of the formulas described herein. In some embodiments, risk may be modelled by altering an internal representation of a portfolio or exposures without altering actual exposures. For example, a process may model carbon emissions risk for a number of exposures or counterparties by, for at least one counterparty, altering the exposure of the institution to the counterparty and re-determining the carbon emissions risk to the institution for that counterparty, and then displaying this modelled risk.

In operation 1030 carbon emissions for a counterparty or exposure may be displayed. For example, a system may display carbon emissions risk for a number of counterparties as a normalized distribution, indicating an indication or point on the distribution corresponding to a counterparty selected or input by a user.

In operation 1040 a party or user may take action on an actual portfolio based on a display or output. For example, a user may sell or purchase assets, or lower or increase exposure to a specific counterparty or in a sector, in order to alter carbon risk, based on information gleaned from a display or output. Output information may be applied to determine and create optimal investment strategies for managing an institution's exposures to carbon risk over time.

Reference is made to FIG. 11, showing a high-level block diagram of an exemplary computing device according to some embodiments of the present invention. Computing device 100 may include a controller 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. for example when executing code 125. More than one computing device 100 may be included in, and one or more computing devices 100 may be, or act as the components of, a system according to embodiments of the invention. Various components, computers, and modules of FIG. 1 may be or include devices such as computing device 100, and one or more devices such as computing device 100 may carry out functions such as those described in FIG. 10 and produce displays as described herein.

Operating system 115 may be or may include any code segment (e.g., one similar to executable code 125) designed and/or configured to perform tasks involving coordination, scheduling, arbitration, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may configure controller 105 to calculate and display carbon emissions risk data and perform other methods as described herein. Although, for the sake of clarity, a single item of executable code 125 is shown in FIG. 11, a system according to some embodiments of the invention may include a plurality of executable code segments similar to executable code 125 that may be loaded into memory 120 or another non-transitory storage medium and cause controller 105, when executing code 125, to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Data such as carbon spend data, user data, merchant data and financial transactions may be stored in storage system 130 and may be loaded from storage system 130 into memory 120 where it may be processed by controller 105. Some of the components shown in FIG. 11 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. Any suitable number of input devices may be operatively connected to computing device 100 as shown by block 135. Output devices 140 may include one or more displays or monitors, speakers and/or any other suitable output devices. Any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

In some embodiments, device 100 may include or may be, for example, a personal computer, a desktop computer, a laptop computer, a workstation, a server computer, a network device, or any other suitable computing device. A system as described herein may include one or more devices such as computing device 100.

Embodiments may improve carbon footprint analysis technology by providing a quantitative and repeatable measurement system to help manage financial institutions' exposure to carbon emission and other climate change related risks. Embodiments may improve the technology of carbon data gathering and calculation to translate the long-term risks associated with carbon emissions into actionable plans that are based on carbon emissions data and the financial exposures of the institution. While carbon emission data can be sourced from external sources, and financial exposure data are usually available from any financial institution's internal databases or public filings, there is no prior method to marry these sources of information into actionable insights. Information provided, such as shown in FIGS. 2-9, may allow or prompt an institution to reduce the weights of the carbon-intensive sectors such as energy, materials and utilities in its portfolio.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for determining and modelling over time the carbon emissions risk to a first institution of one or more counterparties to the first institution, the method comprising:
   at a server, determining, by a processor, carbon emissions data for one or more counterparties using data from a mapping database comprised at the server;
   at the server, for each counterparty, determining, by the processor, carbon emissions risk to the first institution based on the carbon emissions data for the counterparty and the exposure of the first institution to the counterparty;
   at the server, modelling, by the processor, iteratively over a plurality of time periods, based on user input provided by a user computer terminal connected to the server, a carbon emissions risk for one or more counterparties by:
   rank ordering of a set of counterparties by carbon emissions risk;
   reducing the exposure of the first institution to a highest ranked counterparty by a percentage X to result in a currency amount of reduced equity;
   increasing the exposure of the first institution, by the currency amount of reduced equity, to the lowest ranked counterparty having lower carbon emissions data than that of the highest ranked counterparty; and
   repeating the ordering, reducing and increasing operations in an iterative manner; and
   displaying at the user computer terminal:
   carbon emissions risk for a counterparty and carbon emissions risk after modelling, wherein carbon emissions risk after modelling comprises a set of exposures each exposure corresponding to a counterparty;
   wherein if carbon emissions data regarding a counterparty is not comprised in the carbon information database, calculating proxy carbon emissions data for the counterparty.

2. The method of claim 1, wherein modelling a carbon emissions risk for one or more counterparties comprises, after altering the exposure of the institution to a counterparty, re-determining the carbon emissions risk to the institution for that counterparty.

3. The method of claim 1, comprising displaying carbon emissions risk over time.

4. The method of claim 1, comprising displaying carbon emissions risk for a plurality of counterparties as a normalized distribution, and indicating the point on the distribution corresponding to a selected counterparty.

5. The method of claim 1 wherein the mapping database comprises data which maps data from a carbon information database to data in a credit risk management database.

6. The method of claim 1, comprising at the server, determining, by the processor, exposure information for one or more institutions other than the first institution using information obtained by an optical character recognition process accessing a source external to the server, and using the exposure information for one or more institutions other than the first institution to determine carbon emissions risk for the one or more institutions other than the first institution.

7. The method of claim 1, wherein the modelling is subject to constraints comprising one or more of:
the length of each time period;
the size of the portfolio cannot be lower than a given threshold;
the exposure to any one counterparty cannot change beyond a certain bound;
portfolio profitability meets a criteria; and
portfolio loss rate is not beyond a limit.

8. A system for determining and modelling over time the carbon emissions risk to a first institution of one or more counterparties to the first institution, the system comprising:
a memory; and
a server comprising a processor configured to:
determine carbon emissions data for one or more counterparties using data from a mapping database comprised at the server;
for each counterparty determine carbon emissions risk to the first institution based on the carbon emissions data for the counterparty and the exposure of the first institution to the counterparty;
model, iteratively over a plurality of time periods, based on user input provided by a user computer terminal connected to the server, a carbon emissions risk for one or more counterparties by:
rank ordering of a set of counterparties by carbon emissions risk;
reducing the exposure of the first institution to a highest ranked counterparty by a percentage X to result in a currency amount of reduced equity;
increasing the exposure of the first institution, by the currency amount of reduced equity, to the lowest ranked counterparty having lower carbon emissions data than that of the highest ranked counterparty; and
repeating the ordering, reducing and increasing operations in an iterative manner; and
cause to be displayed at the user computer terminal:
carbon emissions risk for a counterparty and carbon emissions risk after modelling, wherein carbon emissions risk after modelling comprises a set of exposures each exposure corresponding to a counterparty;
wherein if carbon emissions data regarding a counterparty is not comprised in the carbon information database, calculating proxy carbon emissions data for the counterparty.

9. The system of claim 8, wherein modelling a carbon emissions risk for a plurality of counterparties comprises, after altering the exposure of the institution to a counterparty, re-determining the carbon emissions risk to the institution for that counterparty.

10. The system of claim 8, wherein the processor is configured to display carbon emissions risk over time.

11. The system of claim 8, wherein the processor is configured to display carbon emissions risk for a plurality of counterparties as a normalized distribution, and indicate the point on the distribution corresponding to a selected counterparty.

12. The system of claim 8, wherein the mapping database comprises data which maps data from a carbon information database to data in a credit risk management database.

13. The system of claim 8, wherein the processor is configured to determine exposure information for one or more institutions other than the first institution using information obtained by an optical character recognition process accessing a source external to the server, and using the exposure information for one or more institutions other than the first institution to determine carbon emissions risk for the one or more institutions other than the first institution.

14. The system of claim 8, wherein the modelling is subject to constraints comprising one or more of:
the length of each time period;
the size of the portfolio cannot be lower than a given threshold;
the exposure to any one counterparty cannot change beyond a certain bound;
portfolio profitability meets a criteria; and
portfolio loss rate is not beyond a limit.

15. A method for determining and modelling over time the carbon emissions risk to a first institution of one or more exposures to the first institution, the method comprising:
at a server, determining, by a processor, carbon emissions data for one or more exposures to the first institution using data from a mapping database comprised at the server;
at the server, for each counterparty, determining, by the processor, exposure information to the first institution based on carbon emissions data for the exposures for the counterparties and the exposures;
at the server, modelling, by the processor, iteratively over a plurality of time periods, based on user input provided by a user computer terminal connected to the server, a carbon emissions risk for one or more counterparties by:
rank ordering of a set of counterparties by carbon emissions risk;
reducing the exposure of the first institution to a highest ranked counterparty by a percentage X to result in a currency amount of reduced equity;
increasing the exposure of the first institution, by the currency amount of reduced equity, to the lowest ranked counterparty having lower carbon emissions data than that of the highest ranked counterparty; and
repeating the ordering, reducing and increasing operations in an iterative manner; and
displaying at the user computer terminal carbon emissions risk for a counterparty and carbon emissions risk after modelling, wherein carbon emissions risk after modelling comprises a set of exposures each exposure corresponding to a counterparty.

16. The method of claim 15, wherein modelling a carbon emissions risk for one or more counterparties comprises, after altering the exposure of the institution to a counterparty, re-determining the carbon emissions risk to the institution for that counterparty.

17. The method of claim 16, comprising displaying carbon emissions risk over time.

18. The method of claim 16, comprising displaying carbon emissions risk for a plurality of exposures as a normalized distribution, and indicating the point on the distribution corresponding to a selected exposure.

19. The method of claim 16 wherein the mapping database comprises data which maps data from a carbon information database to data in a credit risk management database.

20. The method of claim 16, wherein the modelling is subject to constraints comprising one or more of:
the length of each time period;
the size of the portfolio cannot be lower than a given threshold;

the exposure to any one counterparty cannot change beyond a certain bound;
portfolio profitability meets a criteria; and
portfolio loss rate is not beyond a limit.

\* \* \* \* \*